United States Patent
Cheng et al.

(10) Patent No.: US 8,717,977 B2
(45) Date of Patent: May 6, 2014

(54) METHOD AND SYSTEM FOR TRANSMITTING MULTI-CARRIER ENHANCED DEDICATED CHANNEL DATA

(75) Inventors: Xiang Cheng, Shenzhen (CN); Lin Liu, Shenzhen (CN); Yazhu Ke, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 0 days.

(21) Appl. No.: 13/394,989

(22) PCT Filed: Aug. 19, 2010

(86) PCT No.: PCT/CN2010/076143
§ 371 (c)(1),
(2), (4) Date: Mar. 8, 2012

(87) PCT Pub. No.: WO2011/085589
PCT Pub. Date: Jul. 21, 2011

(65) Prior Publication Data
US 2012/0269119 A1 Oct. 25, 2012

(30) Foreign Application Priority Data

Jan. 12, 2010 (CN) .......................... 2010 1 0002249

(51) Int. Cl.
*H04W 4/00* (2009.01)
(52) U.S. Cl.
USPC ....................................................... 370/328
(58) Field of Classification Search
None
See application file for complete search history.

(56) References Cited

U.S. PATENT DOCUMENTS

2009/0316575 A1* 12/2009 Gholmieh et al. ............ 370/225

FOREIGN PATENT DOCUMENTS

| CN | 1801689A A | 7/2006 |
|---|---|---|
| CN | 1863190 A | 11/2006 |
| CN | 101345970 A | 1/2009 |
| EP | 2077675 A1 * | 7/2009 |
| EP | 2472931 A1 | 7/2012 |
| EP | 2515596 A1 | 10/2012 |

OTHER PUBLICATIONS

International Search Report for PCT/CN2010/076143 dated Nov. 8, 2010.
ETSI TS 125 427 V9.0.0 (Jan. 2010), Universal Mobile Telecommunications System (UMTS): UTRAN Iur/Iub Interface user plane protocol for DCH data streams (3GPP TS 25.427 version 9.0.0 Release 9) (pp. 1-47).
3GPP TSG-RAN WG3 66bis, R3-100253, Jan. 18-22, 2010, Valencia, Spain, ZTE, Title: E-DCH Transport Bearer Mode problem, document for discussion (pp. 1-3).

* cited by examiner

*Primary Examiner* — Chi Pham
*Assistant Examiner* — Kouroush Mohebbi
(74) *Attorney, Agent, or Firm* — Banner & Witcoff, Ltd.

(57) ABSTRACT

A method for transmitting multi-carrier enhanced dedicated channel data, comprising a first sending step and a first receiving step, wherein the first sending step comprises: when a node B only has an enhanced dedicated channel cell of a single carrier frequency layer in the multi-carrier, setting "uplink multiplexing information" in an enhanced dedicated channel uplink data frame as "null" and sending it to a serving radio network controller; the first receiving step comprises: the serving radio network controller receiving the enhanced dedicated channel uplink data frame sent by the node B of sender which only has the enhanced dedicated channel cell of a single carrier frequency layer in the multi-carrier, and distinguishing which carrier in the multi-carrier is the carrier for receiving data carried in the enhanced dedicated channel uplink data frame based on carrier identifier information corresponding to carrier frequency of the enhanced dedicated channel cell recorded.

18 Claims, 10 Drawing Sheets

METHOD AND SYSTEM FOR TRANSMITTING MULTI-CARRIER ENHANCED DEDICATED CHANNEL DATA

TECHNICAL FIELD

The present invention relates to a method for transmitting and receiving multi-carrier enhanced dedicated channel data and, more particularly, to a method and an apparatus for transmitting multi-carrier uplink enhanced dedicated channel data between a node B, a drift radio network controller and a serving radio network controller.

BACKGROUND OF THE RELATED ART

In a radio communication system, an interconnection of type B (hereinafter referred to as IUB for short) interface is a logic interface between a radio network controller and a node B. An interconnection of radio network controller RNC (hereinafter referred to as IUR for short) interface is an interface used by the radio network controller to perform signaling and data interaction with other radio network controllers and is an interconnection bond between radio network subsystems.

When a terminal establishes a connection to a radio access network and a soft handoff is generated at the IUR interface, resource of more than one RNC will be used and different radio network controllers play different roles at the same time:

Serving radio network controller: The serving radio network controller refers to a radio network controller keeping the terminal connecting with an interface of a core network. The serving radio network controller is responsible for data transport between the core network and the terminal and for forwarding and receiving interface signaling with the core network; for performing radio resource control and for performing layer 2 processing on data of an air interface; and also for implementing a basic radio resource management operation, such as handoff judgment, outer-loop power control and conversion from the parameters of radio access bearer to the parameters of air interface transport channel.

Drift radio network controller: The drift radio network controllers refer to other radio network controllers other than the serving radio network controller. The drift radio network controller controls the cell used by the terminal, and if desired, the drift radio network controller can perform macro diversity merger. Unless the terminal uses a public transport channel, the drift radio network controller cannot perform layer 2 processing on the data at the terminal plane, while it only transfers the data at the air interface transparently to the serving radio network controller via the routing of the IUR interface. One terminal may have more than one drift radio network controller.

The purpose of a high speed uplink packet access technology is to improve capacity and data throughput in an uplink direction and to reduce the delay in a dedicated channel. The high speed uplink access packet access technology introduces a new transmission channel, i.e., an enhanced dedicated channel, to improve the implementation of physical layer and media access control layer so that a maximum theoretical uplink data rate of 5.6 megabits per second is achieved. The high speed uplink packet access technology retains the characteristics of the soft handoff. The improved Mac Access Control-i (hereinafter referred to as MAC-i for short) data frame received by the air interface is de-multiplexed to a media access control flow, which is transmitted in the form of enhanced dedicated channel uplink data frame from the node B to the serving radio network controller through transmission bearer corresponding to the media access control flow (each media access control flow has a corresponding IUB interface and/or IUR interface transmission bearer).

If the node B belongs to the serving radio network controller, the transmission is directly from the node B to the serving radio network controller, without need of a relay of the drift radio network controller, as shown in FIG. 1. When the serving radio network controller resolves the data carried by the enhanced dedicated channel uplink data frame after receiving the enhanced dedicated channel uplink data frame, it resolves only relying on control information together carried in the enhanced dedicated channel uplink data frame, such as the number of data and the length of data, without need of extra context information and extra record of context information.

If the node B belongs to the drift radio network controller, the transmission is from the node B to the drift radio network controller, and is forwarded and relayed by the drift radio network controller to the serving radio network controller, as shown in FIG. 2. The drift radio network controller only provides transport network layer resource to forward and relay to the serving radio network controller, and the radio network layer resource of the drift radio network controller is bypassed so that it cannot see the enhanced dedicated channel uplink data frame and the specific content of this frame. That is to say, the drift radio network controller can only transparently forward the enhanced dedicated channel uplink data frame and cannot view the enhanced dedicated channel uplink data frame and reset content.

With the development of the technology, it is hoped that a dual-carrier high speed uplink packet access technology (which allows the terminal to transmit data with the high speed uplink packet access technology over two carriers so that the uplink link data rate can be doubled) is introduced into the existing system. A carrier containing a high speed dedicated physical control channel in the dual-carrier is called a main carrier, and the other carrier remained in the dual-carrier is called an auxiliary carrier. For a terminal, each layer of the carrier in the dual-carrier has its own independent active set of the enhanced dedicated channel. The introduction of dual-carrier high speed uplink packet access technology needs to take easy expansibility of subsequent multi-carrier (such as three-carrier, four-carrier) into consideration. A carrier containing a high speed dedicated physical control channel in the multi-carrier is called a main carrier, and other carriers are called a second carrier, a third carrier, and a fourth carrier in the four-carrier.

In the prior art, with respect to a designated terminal using the multi-carrier high speed uplink packet access technology, the specific configuration method is as follows:

In the respective cells providing radio resource for the terminal that is governed by the node B and/or drift radio network controller and is designated to use the multi-carrier high speed uplink packet access technology, if there are not only an enhanced dedicated channel cell of the main carrier but also an enhanced dedicated channel cell of the auxiliary carrier, the serving radio network controller notifies the node B and/or the drift radio network of carrier identifiers corresponding to any two or more carriers in the multi-carrier only when an enhanced dedicated channel cells of frequency layers of any two or more carriers in the multi-carrier is established or added in the node B and/or the drift radio network in advance. For example, in a complicated scenario FIG. 3, there are not only an enhanced dedicated channel cell of the main carrier (i.e. cell 1) but also an enhanced dedicated channel cell of the auxiliary carrier (i.e. cell 2) in the node B1, and there are not only an enhanced dedicated channel cell of the main carrier (i.e. cell 4) but also an enhanced dedicated channel cell of the auxiliary carrier (i.e. cell 5) in the drift radio network controller 2. In the scenario FIG. 3, only when the enhanced dedicated channel cells of two frequency layers of the main and auxiliary carriers in the node B1 and/or drift radio network 2 are established or added in advance, the serving radio network controller 1 notifies the node B1 and/or the drift radio network 2 that the carrier identifiers respectively corresponding to the two carriers in the dual-carrier are as follows: the carrier identifier corresponding to the carrier frequency of cell 1 in the dual-carrier is a main carrier; the carrier identifier corresponding to the carrier frequency of cell 2 in the dual-carrier is an auxiliary carrier; the carrier identifier corresponding to the carrier frequency of cell 4 in the dual-carrier is a main carrier; the carrier identifier corresponding to the carrier frequency of cell 5 in the dual-carrier is an auxiliary carrier.

In the respective cells providing radio resource for the terminal that is governed by the node B and/or drift radio network controller and is designated to use the multi-carrier high speed uplink packet access technology, if there is only an enhanced dedicated channel cell of a single carrier frequency layer in the multi-carrier, the serving radio network controller is established by means of traditional single carrier and does not notify this node B and/or drift radio network controller of any information about the multi-carrier and a carrier identifier corresponding to the single carrier frequency layer, only when an enhanced dedicated channel cells of the single carrier frequency layer in the multi-carrier is established or added in this node B and/or drift radio network in advance. This node B and/or drift radio network controller can only see and believe that the terminal uses single carrier resource, but does not know that the terminal uses the multi-carrier high speed uplink packet access technology (resource of the single carrier frequency layer in the multi-carrier is only used in this node B and/or drift radio network controller), and thus it surely does not know the carrier identifier corresponding to the single carrier frequency layer in the multi-carrier. For example, in FIG. 3, there is only an enhanced dedicated channel cell of the single carrier frequency layer (main carrier frequency layer) in the multi-carrier (i.e. cell 3) in the node B2, and there is only an enhanced dedicated channel cell of the single carrier frequency layer (auxiliary carrier frequency layer) in the multi-carrier (i.e. cell 6) in the drift radio network controller 3. In this scenario of FIG. 3, the service network controller 1 is established by means of traditional single carrier and does not notify this node B and/or drift radio network controller of any information about the multi-carrier and carrier identifier corresponding to this single carrier frequency layer only when an enhanced dedicated channel cell of the single carrier frequency layer of the main carrier or the auxiliary carrier is established or added in the node B2 and/or drift radio network controller 3 in advance.

In the prior art, an "uplink multiplexing information" cell is added in the enhanced dedicated channel uplink data frame to adapt to introduction of the dual-carrier high speed uplink packet access technology. The "uplink multiplexing information" is used to indicate the carrier identifier of the carrier at which the data carried in the enhanced dedicated channel uplink data frame is received.

In the prior art, the serving radio network controller must distinguish whether the data carried in the enhanced dedicated channel uplink data frame is derived from the data received at main carrier or the data received at auxiliary carrier so as to respectively perform reordering and macro diversity merger based on a single carrier. For a serving radio network controller, once the data received at different carriers are mixed, they cannot be distinguished and the serving radio network controller cannot normally perform reordering and macro diversity merger so that all data are false, causing the practical service to be unavailable and finally the terminal to be disconnected.

Based on configurations and usage modes in the prior art, in the scenario as shown in FIG. 3, the configuration and transmission of enhanced dedicated channel uplink data frames on various interfaces are as shown in FIG. 4 and are explained as follows:

The serving radio network controller 1 receives the enhanced dedicated channel uplink data frame numbered as 1 and forwarded and relayed by the drift radio network controller 3 via an IUR interface. The data carried by the enhanced dedicated channel uplink data frame actually is derived from the data received at auxiliary carrier, but there is no carrier identifier describing the auxiliary carrier in the enhanced dedicated channel uplink data frame.

The serving radio network controller 1 receives the enhanced dedicated channel uplink data frames numbered as 3 and 4 and transmitted by the node B1 via an IUB interface. The enhanced dedicated channel uplink data frame numbered as 3 actually is derived from the data received at main carrier, wherein "uplink multiplexing information" in this frame is indicative of "main carrier"; the enhanced dedicated channel uplink data frame numbered as 4 actually is derived from the data received at auxiliary carrier, wherein "uplink multiplexing information" in this frame is indicative of "auxiliary carrier".

The serving radio network controller 1 receives the enhanced dedicated channel uplink data frame numbered as 5 and transmitted by the node B2 via an IUB interface. The data carried by the enhanced dedicated channel uplink data frame are actually derived from the data received at main carrier, but there is no carrier identifier describing the auxiliary carrier in the enhanced dedicated channel uplink data frame.

The serving radio network controller 1 receives the enhanced dedicated channel uplink data frames numbered as 6 and 7 and forwarded and relayed by the drift radio network controller 2 via an IUR interface. The data carried by the enhanced dedicated channel uplink data frames numbered as 6 and 7 are actually derived from the data received at the main carrier and auxiliary carrier, but there is no carrier identifier describing the auxiliary carrier in the enhanced dedicated channel uplink data frames.

The inventor of the present invention discovered that if, the serving radio network controller 1 distinguished whether the data carried by the enhanced dedicated channel uplink data frames are derived from the data received at main carrier or auxiliary carrier after receiving the enhanced dedicated channel uplink data frames on various interfaces, the following errors and confusion would occur:

The enhanced dedicated channel uplink data frames relayed from the drift radio network controller 2 are received via IUR interfaces, which are enhanced dedicated channel uplink data frames numbered as 6 and 7.

Although the serving radio network controller 1 has already notified the drift radio network 2 of the carrier identifiers respectively corresponding to the two carriers in the dual-carrier, that is, the carrier identifier corresponding to the carrier frequency of a cell 4 in the dual-carrier is a main carrier and the carrier identifier corresponding to the carrier frequency of a cell 5 in the dual-carrier is an auxiliary carrier when the enhanced dedicated channel cells of the two carrier frequency layers of the main carrier and auxiliary carriers in the dual-carrier are established or added in the drift radio network controller 2 in advance, the drift radio network controller can only transparently transfer the enhanced dedicated channel uplink data frames and cannot view and reset content for the enhanced dedicated channel uplink data frames. Therefore, limited to the above principles, even if the drift radio network controller is able to or wants to add carrier identifiers in the enhanced dedicated channel uplink data frames, the content cannot be reset. For serving radio network controller 1, it is originally envisaged that the carrier identifiers respectively corresponding to the two carriers in the dual-carrier are configured in advance, hoping to distinguish whether it is derived from the data received at the main carrier or the auxiliary carrier by "uplink multiplexing information" of the carrier identifiers in the enhanced dedicated channel uplink data frames, but there is no "uplink multiplexing information" of carrier identifiers when the enhanced dedicated channel data frames numbered as 6 and 7 are actually received, and then the serving radio network controller 1 cannot identify an origin carrier situation and can only discard the data.

The enhanced dedicated channel uplink data frame relayed by the drift radio network controller 3 is received via an IUR interface, which is an enhanced dedicated channel uplink data frame numbered as 1, and the enhanced dedicated channel uplink data frame transmitted by the node B2 is received via an IUB interface, which is an enhanced dedicated channel uplink data frame numbered as 5. However, there is no "uplink multiplexing information" of carrier identifiers when the enhanced dedicated channel uplink data frames numbered as 1 and 5 are actually received. When the serving radio network controller resolves the data carried by the enhanced dedicated channel uplink data frames after receiving the enhanced dedicated channel uplink data frames, and it is solved only relying on control information together carried in the enhanced dedicated channel uplink data frames, such as the number of data and the length of data, without need of extra context information and extra record of context information. The serving radio network controller 1 cannot identify whether it is derived from the main carrier or the auxiliary carrier, and can only discard data.

Therefore, this kind of configuration mode in the prior art is false. Since all possible occurring scenario implementations are not taken into serious consideration, the issue that the serving radio network controller cannot distinguish whether the data carried by the enhanced dedicated channel uplink data frames are derived from the data received at the main carrier or the auxiliary carrier would occur, and the radio network controller cannot distinguish whether it is derived from the data received at the main carrier or the auxiliary carrier, that is, it cannot normally perform reordering and macro diversity merger, and all data are discarded falsely so as to cause the practical service to be unavailable and finally to be disconnected. It means that the existing dual-carrier high speed uplink packet access technology is impracticable.

SUMMARY OF THE INVENTION

The technical problem to be solved by the present invention is to provide a method for sending, receiving and transmitting multi-carrier enhanced dedicated channel data as well as a drift radio network controller, a serving radio network controller and a transmission system so that the serving radio network controller can correctly distinguish the data received at main carrier and the data received at auxiliary carrier so as to normally perform reordering and macro-diversity merger.

To solve the above problem, the present invention provides a method for transmitting multi-carrier enhanced dedicated channel data, comprising a first sending step and a first receiving step:

The first sending step comprises: when a node B only has an enhanced dedicated channel cell of a single carrier frequency layer in the multi-carrier, the node B setting "uplink multiplexing information" in an enhanced dedicated channel uplink data frame to be "null" and sending the enhanced dedicated channel uplink data frame to a serving radio network controller;

The first receiving step comprises: the serving radio network controller receiving the enhanced dedicated channel uplink data frame sent by the node B of sender which only has the enhanced dedicated channel cell of a single carrier frequency layer in the multi-carrier, the serving radio network controller distinguishing which carrier in the multi-carrier is the carrier for receiving data carried in the enhanced dedicated channel uplink data frame based on the carrier identifier information corresponding to carrier frequency of an enhanced dedicated channel cell recorded when the enhanced dedicated channel cell of a single carrier frequency layer in the multi-carrier is established or added in advance;

Or, the method comprises: a second sending step, a relaying step and a second receiving step:

the second sending step comprises: when a node B only has an enhanced dedicated channel cell of a single carrier frequency layer in the multi-carrier, the node B setting "uplink multiplexing information" in the enhanced dedicated channel uplink data frame to be "null" and sending the enhanced dedicated channel uplink data frame to a drift radio network controller;

the relaying step comprises: the drift radio network controller receiving the enhanced dedicated channel uplink data frame sent by the node B which only has the enhanced dedicated channel cell of a single carrier frequency layer in the multi-carrier;

if all the nodes B governed by the drift radio network controller are nodes B of the enhanced dedicated channel cell of a single carrier frequency layer in the multi-carrier and are all in an identical carrier frequency layer, the drift radio network controller not processing the received enhanced dedicated channel uplink data frame and sending it to the serving radio network controller;

if all the nodes B governed by the drift radio network controller are nodes B of the enhanced dedicated channel cell of a single carrier frequency layer in the multi-carrier but do not belong to an identical carrier frequency layer, or all the nodes B governed by the drift radio network controller are not all nodes B of the enhanced dedicated channel cell of a single carrier frequency layer in the multi-carrier, the drift radio network controller setting the "uplink multiplexing information" which is "null" in the received enhanced dedicated channel uplink data frame to be carrier identifier information of the carrier for receiving data carried in the enhanced dedicated channel uplink data frame, and sending it to the serving radio network controller;

the second receiving step comprises: the serving radio network controller receiving the enhanced dedicated channel uplink data frame sent by the drift radio network controller of the relay party which only has the enhanced dedicated channel cell of a single carrier frequency layer in the multi-carrier, the serving radio network controller distinguishing which carrier in the multi-carrier is a carrier for receiving data carried in the enhanced dedicated channel uplink data frame based on the carrier identifier information corresponding to carrier frequency of the enhanced dedicated channel cell recorded when the enhanced dedicated channel cell of the single carrier frequency layer in the multi-carrier is established or added in advance.

The first sending step further comprises: when the node B has an enhanced dedicated channel cell of frequency layers of any two or more carriers in the multi-carrier, the node B setting "uplink multiplexing information" in the enhanced dedicated channel uplink data frame to be carrier identifier information of a carrier for receiving data carried in the enhanced dedicated channel uplink data frame and sending the enhanced dedicated channel uplink data frame to the serving radio network controller;

The first receiving step further comprises: the serving radio network controller receiving the enhanced dedicated channel uplink data frame sent by the node B of the sender which has the enhanced dedicated channel cell of frequency layers of any two or more carriers in the multi-carrier, the serving radio network controller distinguishing which carrier in the multi-carrier is a carrier for receiving data carried in the enhanced dedicated channel uplink data frame based on the carrier identifier information indicated by "uplink multiplexing information" in the enhanced dedicated channel uplink data frame.

The second sending step further comprises: when the node B has an enhanced dedicated channel cell of frequency layers of any two or more carriers in the multi-carrier, the node B setting "uplink multiplexing information" in the enhanced dedicated uplink data frame to be carrier identifier information of a carrier for receiving data carried in the enhanced dedicated channel uplink data frame; the node B sending the enhanced dedicated channel uplink data frame to the drift radio network controller;

The relaying step further comprises: the drift radio network controller receiving the enhanced dedicated channel uplink data frame sent by the node B which has the enhanced dedicated channel cell of frequency layers of any two or more carriers in the multi-carrier, the drift radio network controller not processing the received enhanced dedicated channel uplink data frame and sending it to the serving radio network controller;

The second receiving step further comprises: the serving radio network controller receiving the enhanced dedicated channel uplink data frame sent by the drift radio network controller of the relay party of the sender which has the enhanced dedicated channel cell of frequency layers of any two or more carriers in the multi-carrier, the serving radio network controller distinguishing which carrier in the multi-carrier is a carrier for receiving data carried in the enhanced dedicated channel uplink data frame based on the carrier identifier information indicated by "uplink multiplexing information" in the enhanced dedicated channel uplink data frame.

Before the first sending step and the second sending step, the method further comprises:

the node B obtaining the carrier identifier information according to the following manner: the serving radio network controller or drift radio network controller establishes or adds in the node B an enhanced dedicated channel cell of frequency layers of any two or more carriers in the multi-carrier and notifies the node B of carrier identifier information corresponding to carrier frequency of the enhanced dedicated channel cell.

Before the relaying step, the method further comprises:

the drift radio network controller obtaining the carrier identifier information according to the following manner: the serving radio network controller establishes or adds in the drift radio network controller an enhanced dedicated channel cell of frequency layers of any two or more carriers and notifies the drift radio network controller of carrier identifier information corresponding to carrier frequency of the enhanced dedicated channel cell.

The present invention further provides a method for sending multi-carrier enhanced dedicated channel data, comprising:

the drift radio network controller receiving an enhanced dedicated channel uplink data frame sent by a node B which only has an enhanced dedicated channel cell of a single carrier frequency layer in the multi-carrier; and if all the nodes B governed by the drift radio network controller are nodes B of the enhanced dedicated channel cell of a single carrier frequency layer in the multi-carrier and are in an identical carrier frequency layer, the drift radio network controller not processing the received enhanced dedicated channel uplink data frame and sending it to the serving radio network controller;

if all the nodes B governed by the drift radio network controller are nodes B of the enhanced dedicated channel cell of a single carrier frequency layer in the multi-carrier but do not belong to an identical carrier frequency layer, or if all the nodes B governed by the drift radio network controller are not all nodes B of the enhanced dedicated channel cell of a single carrier frequency layer in the multi-carrier, the drift radio network controller setting "uplink multiplexing information" which is "null" in the received enhanced dedicated channel uplink data frame to be carrier identifier information of the carrier for receiving data carried in the enhanced dedicated channel uplink data frame and sending it to the serving radio network controller.

The drift radio network controller receives an enhanced dedicated channel uplink data frame sent by a node B which has an enhanced dedicated channel cell of frequency layers of any two or more carriers in the multi-carrier, the drift radio network controller does not process the received enhanced dedicated channel uplink data frame and sends it to the serving radio network controller.

Before the drift radio network controller receives the enhanced dedicated channel uplink data frame, the method further comprises: the drift radio network controller establishing or adding in the node B an enhanced dedicated channel cell of frequency layers of any two or more carriers in the multi-carrier and notifying the node B of carrier identifier information corresponding to carrier frequency of the enhanced dedicated channel cell.

The present invention further provides a method for receiving multi-carrier enhanced dedicated channel data, comprising:

the serving radio network controller receiving an enhanced dedicated channel uplink data frame sent by a drift radio network controller of relay party or a node B of sender which only has an enhanced dedicated channel cell of a single carrier frequency layer in the multi-carrier, the serving radio network controller distinguishing which carrier in the multi-carrier is a carrier for receiving data carried in the enhanced dedicated uplink data frame based on the carrier identifier information corresponding to carrier frequency of an enhanced dedicated channel cell recorded when the enhanced dedicated channel cell of a single carrier frequency layer in the multi-carrier is established or added in advance.

The method further comprises: the serving radio network controller receiving an enhanced dedicated channel uplink data frame sent by a node B of sender or a drift radio network controller of relay party which has an enhanced dedicated channel cell of frequency layers of any two or more carriers in the multi-carrier, the serving radio network controller distinguishing which carrier in the multi-carrier is a carrier for receiving data carried in the enhanced dedicated channel uplink data frame based on the carrier identifier information indicated by "uplink multiplexing information" in the enhanced dedicated channel uplink data frame.

Before the serving radio network controller receives the enhanced dedicated channel uplink data frame, the method further comprises: the serving radio network controller establishing or adding in the node B or drift radio network controller an enhanced dedicated channel cell of frequency layers of any two or more carriers in the multi-carrier, and notifying the node B or drift radio network controller of carrier identifier information corresponding to carrier frequency of the enhanced dedicated channel cell.

The present invention further provides a system for transmitting multi-carrier enhanced dedicated channel data, comprising: a first node B and a first serving radio network controller, wherein:

the first node B is configured to set "uplink multiplexing information" in an enhanced dedicated channel uplink date frame to be "null" and send the enhanced dedicated channel uplink data frame to the first serving radio network controller when the node B only has the enhanced dedicated channel cell of a single carrier frequency layer in the multi-carrier;

the first serving radio network controller is configured: to receive an enhanced dedicated channel uplink data frame sent by a first node B of sender which only has an enhanced dedicated channel cell of a single carrier frequency layer in the multi-carrier, and to distinguish which carrier in the multi-carrier is a carrier for receiving data carried in the enhanced dedicated channel uplink data frame based on the carrier identifier information corresponding to carrier frequency of an enhanced dedicated channel cell recorded when the enhanced dedicated channel cell of a single carrier frequency layer in the multi-carrier is established or added in advance;

Or, the system comprises: a second node B, a drift radio network controller and a second serving radio network controller, wherein:

the second node B is configured: to set "uplink multiplexing information" in the enhanced dedicated channel data frame to be "null" when the second node B only has the enhanced dedicated channel cell of a single carrier frequency layer in the multi-carrier; and to send the enhanced dedicated channel uplink data frame to the drift radio network controller;

the drift radio network controller is configured to receive the enhanced dedicated channel uplink data frame sent by a second node B which only has an enhanced dedicated channel cell of a single carrier frequency layer in the multi-carrier; and if all the nodes B governed by the drift radio network controller are nodes B of the enhanced dedicated channel cell of a single carrier frequency layer in the multi-carrier and are in an identical carrier frequency layer, the drift radio network controller not processing the received enhanced dedicated channel uplink data frame and sending it to a second serving radio network controller;

if all the nodes governed by the drift radio network controller are nodes B of the enhanced dedicated channel cell of a single carrier frequency layer in the multi-carrier but do not belong to an identical carrier frequency layer, or if all the nodes governed by the drift radio network controller are not all nodes B of the enhanced dedicated channel cell of a single carrier frequency layer in the multi-carrier, the drift radio network controller setting "uplink multiplexing information" which is "null" in the received enhanced dedicated channel uplink data frame to be carrier identifier information of a carrier for receiving data carried in the enhanced dedicated channel uplink data frame and sending it to the second radio network controller;

the second serving radio network controller is configured: to receive the enhanced dedicated channel uplink data frame sent by the drift radio network controller of relay party which only has an enhanced dedicated channel cell of a single carrier frequency layer in the multi-carrier, and to distinguish which carrier in the multi-carrier is a carrier for receiving data carried in the enhanced dedicated channel uplink data frame based on the carrier identifier information corresponding to carrier frequency of the enhanced dedicated channel cell recorded when the enhanced dedicated channel cell of a single carrier frequency layer in the multi-carrier is established or added in advance.

The first node B is further configured: to set "uplink multiplexing information" in the enhanced dedicated channel uplink data frame to be carrier identifier information of a carrier for receiving data carried in the enhanced dedicated channel uplink data frame, and to send the enhanced dedicated channel uplink data frame to the first serving radio network controller, when the first node B has the enhanced dedicated channel cell of frequency layers of any two or more carriers in the multi-carrier.

The first serving radio network controller is further configured: to receive an enhanced dedicated channel uplink data frame sent by a first node B of sender which has the enhanced dedicated channel cell of frequency layers of any two or more carriers in the multi-carrier, and to distinguish which carrier in the multi-carrier is a carrier for receiving data carried in the enhanced dedicated channel uplink data frame based on the carrier identifier information indicated by "uplink multiplexing information" in the enhanced dedicated channel uplink data frame.

The second node B is further configured: to set "uplink multiplexing information" in the enhanced dedicated channel uplink data frame to be carrier identifier information of a carrier for receiving data carried in the enhanced dedicated channel uplink data frame, and to send the enhanced dedicated channel uplink data frame to the drift radio network controller, when the second node B has the enhanced dedicated channel cell of frequency layers of any two or more carriers in the multi-carrier;

The drift radio network controller is further configured: to receive an enhanced dedicated channel uplink data frame sent by the node B which has the enhanced dedicated channel cell of frequency layers of any two or more carriers in the multi-carrier, to not process the received enhanced dedicated channel uplink data frame, and to send it to the second serving radio network controller;

the serving radio network controller is further configured: to receive an enhanced dedicated channel uplink data frame sent by the drift radio network controller of relay party of sender which has the enhanced dedicated channel cell of frequency layers of any two or more carriers in the multi-carrier, and to distinguish which carrier in the multi-carrier is a carrier for receiving data carried in the enhanced dedicated channel uplink data frame based on the carrier identifier information indicated by "uplink multiplexing information" in the enhanced dedicated channel uplink data frame.

The drift radio network controller is further configured: to establish or add in the second node B an enhanced dedicated channel cell of frequency layers of any two or more carriers in the multi-carrier, and to notify the second node B of carrier identifier information corresponding to carrier frequency of the enhanced dedicated channel cell.

The first serving radio network controller and the second serving radio network controller are further configured: to establish or add in the drift radio network controller or first node B an enhanced dedicated channel cell of frequency layers of any two or more carriers, and to notify the drift radio network controller or first node B of carrier identifier information corresponding to carrier frequency of the enhanced dedicated channel cell.

The present invention further provides a drift radio network controller, which is configured:

to receive an enhanced dedicated channel uplink data frame sent by a node B which only has an enhanced dedicated channel cell of a single carrier frequency layer in the multi-carrier; and to not process the received enhanced dedicated channel uplink data frame and send it to the serving radio network controller if all the nodes B governed by the drift radio network controller are all nodes B of the enhanced dedicated channel cell of a single carrier frequency layer in the multi-carrier and are in an identical carrier frequency layer;

to set "uplink multiplexing information" which is "null" in the received enhanced dedicated channel uplink data frame to be carrier identifier information of a carrier for receiving data carried in the enhanced dedicated channel uplink data frame and send it to the serving radio network controller, if all the nodes B governed by the drift radio network controller are all nodes B of the enhanced dedicated channel cell of a single carrier frequency layer in the multi-carrier but do not belong to an identical carrier frequency layer or if all the nodes B governed by the drift radio network controller are not all nodes B of the enhanced dedicated channel cell of a single carrier frequency layer in the multi-carrier.

The drift radio network controller is further configured: to receive an enhanced dedicated channel uplink data frame sent by a node B which has an enhanced dedicated channel cell of frequency layers of any two or more carriers in the multi-carrier, and to not process the received enhanced dedicated uplink data frame and send it to the serving radio network controller.

The drift radio network controller is further configured: to establish or add in the node B an enhanced dedicated channel cell of frequency layers of any two or more carriers in the multi-carrier, and to notify the node B of carrier identifier information corresponding to carrier frequency of the enhanced dedicated channel cell.

The present invention further provides a serving radio network controller which is configured: to receive an enhanced dedicated channel uplink data frame sent by a drift radio network controller of relay party or a node B of sender which only has an enhanced dedicated channel cell of a single carrier frequency layer in the multi-carrier, and to distinguish which carrier in the multi-carrier is a carrier for receiving data carried in the enhanced dedicated channel uplink data frame based on the carrier identifier information corresponding to carrier frequency of an enhanced dedicated channel cell recorded when the enhanced dedicated channel cell of a single carrier frequency layer in the multi-carrier is established or added in advance.

The serving radio network controller is further configured: to receive an enhanced dedicated channel uplink data frame sent by s drift radio network controller of relay party or a node B of sender which has an enhanced dedicated channel cell of frequency layers of any two or more carriers in the multi-carrier, and to distinguish which carrier in the multi-carrier is a carrier for receiving data carried in the enhanced dedicated channel data frame based on the carrier identifier information indicated by "uplink multiplexing information" in the enhanced dedicated channel uplink data frame.

The serving radio network controller is further configured: to establish or add in the node B or the drift radio network controller an enhanced dedicated channel cell of frequency layers of any two or more carriers in the multi-carrier, and to notify the node B or the drift radio network controller of carrier identifier information corresponding to carrier frequency of the enhanced dedicated channel cell.

To sum up, the present invention provides a method for sending, receiving and transmitting multi-carrier enhanced dedicated channel data, by setting and sending carrier identifier information of an enhanced dedicated channel uplink data frame by a node B of sender; setting and sending carrier identifier information of the enhanced dedicated channel uplink data frame by a drift radio network controller of relay party; receiving and distinguishing carrier by a serving radio network controller of receiver, the carrier at which the data carried in the enhanced dedicated channel uplink data frame is received can be correctly recognized and distinguished, thereby ensuring that the data carried in the enhanced dedicated channel uplink data frame can be correctly reordered. Thus it has the following obvious technical effect:

In the limited configuration information in the prior art, when an enhanced dedicated channel cell of frequency layers of any two or more carriers in the multi-carrier is established or added in the drift radio network controller as recorded in advance by the drift radio network controller, a serving radio network controller notifies the drift radio network controller of carrier identifier information corresponding to carrier frequency in the enhanced dedicated channel cell, and carrier identifier information corresponding to carrier frequency of the enhanced dedicated channel cell is recorded when the service network controller establishes or adds the enhanced dedicated channel cell of a single carrier frequency layer in the multi-carrier as recorded in advance by the service network controller, by means of the information recorded in advance, it is to correct "uplink multiplexing information" which is "null" in the enhanced dedicated channel uplink data frame to be actual carrier identifier information to solve the processing defect of sending and receiving the enhanced dedicated channel uplink data frame, so that the carrier at which data carried in the enhanced dedicated channel uplink data frame are received can be correctly recognized and distinguished, thereby ensuring that the data carried in the enhanced dedicated channel uplink data frame can be correctly reordered, ensuring normal sending of the terminal actual service data, and ensuring that the dual-carrier high speed uplink packet access technology is practicable.

PREFERRED EMBODIMENTS OF THE PRESENT INVENTION

Figure 1:
FIG. 1 is a schematic diagram of a process of sending and receiving an enhanced dedicated channel uplink data frame when a node B belongs to a serving radio network controller.
Figure 2:
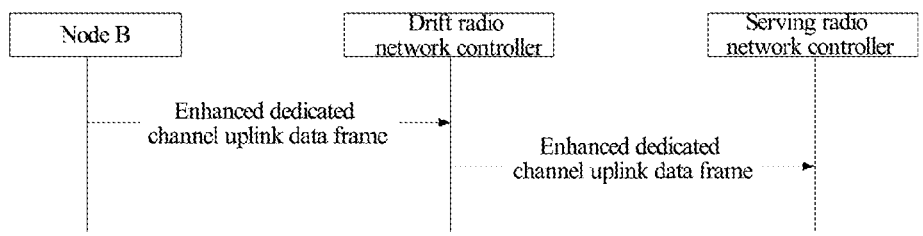
FIG. 2 is a schematic diagram of a process of sending and receiving an enhanced dedicated channel uplink data frame when node B belongs to a drift radio network controller.

The present invention provides a method for sending and receiving multi-carrier enhanced dedicated channel data, by setting and sending carrier identifier information of an enhanced dedicated channel uplink data frame by a node B of sender; setting and sending carrier identifier information of an enhanced dedicated channel uplink data frame by a drift radio network controller of relay party; receiving and distinguishing carrier by a serving radio network controller of receiver, a carrier for receiving data carried in the enhanced dedicated channel uplink data frame can be correctly identified and distinguished, ensuing that the data carried in the enhanced dedicated channel uplink data frame can be correctly reordered.

The technical solution comprises individual processing in three aspects:

The first aspect: processing of sender, that is, processing of a node B to which the enhanced dedicated channel cell belongs, comprising the following steps:

First step: with respect to a designated terminal using multi-carrier high speed uplink packet access technology:

a) setting "uplink multiplexing information" in an enhance dedicated channel uplink data frame to be "null" by a node B which only has an enhanced dedicated channel cell of a single carrier frequency layer in the multi-carrier;

b) setting "uplink multiplexing information" in an enhance dedicated channel uplink data frame to be carrier identifier information of a carrier for receiving data carried in the data frame by a node B which has an enhanced dedicated channel cell of frequency layers of any two or more carriers in the multi-carrier.

Second step: the node B sends the enhanced dedicated channel uplink data frame to:

a) a serving radio network controller (if the node B of sender belongs to the serving radio network controller and there is no relay party, sending to the receiver directly by the sender); or, b) a drift radio network controller (if the node of sender belongs to the drift radio network controller and there is a relay party, sending to the relay party by the sender and then to the receiver by the relay party).

As for the first step, further, said "enhanced dedicated channel cell" refers to a cell using enhanced dedicated channel in an uplink direction.

As for the first step, further, said "carrier for receiving data carried in the data frame" refers to a carrier frequency of enhanced dedicated channel cell receiving Mac Access Control-improved (hereinafter referred to as MAC-i for short) data frame.

As for the first step, further, said "carrier identifier information of a carrier" is used for identifying carriers. In dual carriers, the carrier identifier information is a main carrier and an auxiliary carrier. In three carriers, the carrier identifier information is a main carrier, a second carrier and a third carrier. In four carriers, the carrier identifier information is a main carrier, a second carrier, a third carrier and a fourth carrier.

As for the first step, further, when an enhanced dedicated channel cell of frequency layers of any two or more carriers in the multi-carrier is established or added in the node B in advance, said "carrier identifier information of a carrier" refers to carrier identifier information corresponding to carrier frequency of the enhanced dedicated channel cell which is notified to the node B by a drift radio network controller or a serving radio network controller. The node B records the carrier identifier information.

As for the first step, further, for a node B which only has an enhanced dedicated channel cell of a single carrier frequency layer in the multi-carrier, the drift radio network controller or serving radio network controller does not notify the node B of carrier identifier information corresponding to carrier frequency of the enhanced dedicated channel when the enhanced dedicated channel cell of a single carrier frequency layer in the multi-carrier is established or added in advance. The node B does not obtain the carrier identifier information.

The second aspect: processing of relay party, that is, processing of a drift radio network controller, comprising the following steps:

First step: with respect to a designated terminal using multi-carrier high speed uplink packet access technology, the drift radio network controller receives:

a) an enhanced dedicated channel uplink data frame sent by a node B which only has an enhanced dedicated channel cell of a single carrier frequency layer in the multi-carrier:

a-1) if all the nodes B governed by the drift radio network controller are all nodes B of the enhanced dedicated channel cell of a single carrier frequency layer in the multi-carrier and are in an identical carrier frequency layer, the drift radio network controller does not process the received enhanced dedicated channel uplink data frame and sends it to the serving radio network controller;

a-2) if all the nodes B governed by the drift radio network controller are all nodes B of the enhanced dedicated channel cell of a single carrier frequency layer in the multi-carrier but do not belong to an identical carrier frequency layer, the drift radio network controller sets "uplink multiplexing information" which is "null" in the received enhanced dedicated channel uplink data frame to be carrier identifier information of a carrier for receiving data carried in the data frame and sends it to the serving radio network controller.

a-3) if all the nodes B governed by the drift radio network controller are not all nodes B of the enhanced dedicated channel cell of a single carrier frequency layer in the multi-carrier, the drift radio network controller sets "uplink multiplexing information" which is "null" in the received enhanced dedicated channel uplink data frame to be carrier identifier information of a carrier for receiving data carried in the data frame and sends it to the serving radio network controller.

b) if the enhanced dedicated channel uplink data frame is sent by the node B having the enhanced dedicated channel cell of any two or more carrier frequency layers in the multi-carrier, the drift radio network controller does not process the received enhanced dedicated channel uplink data frame and sends it to the serving radio network controller.

As for the first step, further, said "enhanced dedicated channel cell" refers to a cell using enhanced dedicated channel in an uplink direction.

As for the first step, further, said "carrier for receiving data carried in the data frame" refers to a carrier frequency of an enhanced dedicated channel cell receiving a MAC-i data frame.

As for the first step, further, said "carrier identifier information of a carrier" is used for identifying carriers. In dual carriers, the carrier identifier information is a main carrier and an auxiliary carrier. In three carriers, the carrier identifier information is a main carrier, a second carrier and a third carrier. In four carriers, the carrier identifier information is a main carrier, a second carrier, a third carrier and a four carrier.

As for the first step, further, when an enhanced dedicated channel cell of frequency layers of any two or more carriers in the multi-carrier is established or added in the drift radio network controller, the serving radio network controller notifies the drift radio network controller of carrier identifier information corresponding to carrier frequency layer of the enhanced dedicated channel cell. The drift radio network controller records the carrier identifier information.

As for the first step, further, for the drift radio network controller which only has an enhanced dedicated cell of a single carrier frequency layer in the multi-carrier, when an enhanced dedicated channel cell of a single carrier frequency layer in the multi-carrier is established or added in advance, the serving radio network controller does not notify the drift radio network controller of the carrier identifier information corresponding to carrier frequency of the enhanced dedicated channel cell. The drift radio network controller does not obtain the carrier identifier information.

As for the first step, further, the various node B carrier configuration information, such as "a node B which only has an enhanced dedicated channel cell of a single frequency layer in the multi-carrier", "an enhanced dedicated channel uplink data frame sent by a node B which has an enhanced dedicated channel cell of frequency layers of any two or more carriers in the multi-carrier", "if all the nodes B governed by the drift radio network controller are all nodes B of the enhanced dedicated channel cell of a single carrier frequency layer in the multi-carrier and are in an identical frequency layer", "if all the nodes B governed by the drift radio network controller are all nodes B of the enhanced dedicated channel cell of a single carrier frequency layer in the multi-carrier but do not belong to an identical carrier frequency layer" and "if all the nodes B governed by the drift radio network controller are not all nodes B of the enhanced dedicated channel cell of a single carrier frequency layer in the multi-carrier", is recorded when the drift radio network controller establishes or adds the enhanced dedicated channel cell in the governed node B.

As for the first step, further, if "the enhanced dedicated channel uplink data frame is sent by the node B which has an enhanced dedicated channel cell of frequency layers of any two or more carriers in the multi-carrier", the "uplink multiplexing information" carried by said "enhanced dedicated channel uplink data frame" is carrier identifier information of a carrier for receiving data in the enhanced dedicated channel uplink data frame, when the carrier identifier information is that an enhanced dedicated channel cell of frequency layers of any two or more carriers in the multi-carrier is established or added in the node B, the drift radio network controller notifies the node B of carrier identifier information corresponding to carrier frequency of the enhanced dedicated channel cell. The node B records the carrier identifier information and applies it into said "enhanced dedicated channel uplink data frame".

As for the first step, further, if "the enhanced dedicated channel uplink data frame is sent by the node B which only has an enhanced dedicated channel cell of a single carrier frequency layer in the multi-carrier", "uplink multiplexing information" carried by said "enhanced dedicated channel uplink data frame" is "null". As for a node B which only has an enhanced dedicated channel cell of a single carrier frequency layer in the multi-carrier, when an enhanced dedicated channel cell of a single carrier frequency layer in the multi-carrier is established or added in advance, the drift radio network controller does not notify the node B of carrier identifier information corresponding to carrier frequency of the enhanced dedicated channel cell. The node B does not obtain the carrier identifier information.

The third aspect: the processing of receiver, that is, the processing of a serving radio network controller, comprising the following steps:

The first step: with respect to a designated terminal using multi-carrier high speed uplink packet access technology, the serving radio network controller receives:

a) an enhanced dedicated channel uplink data frame sent by a drift radio network controller of relay party or a node B of sender which only has the enhanced dedicated channel cell of a single carrier frequency layer in the multi-carrier, wherein the serving radio network controller distinguishes which carrier in the multi-carrier is the carrier for receiving data carried in the enhanced dedicated channel uplink data frame based on the carrier identifier information corresponding to carrier frequency of the enhanced dedicated channel cell recorded when the enhanced dedicated channel cell of a single carrier frequency layer in the multi-carrier is established or added in advance;

b) an enhanced dedicated channel uplink data frame sent by a drift radio network controller of relay party or a node B of sender which has the enhanced dedicated channel cell of frequency layers of any two or more carriers in the multi-carrier, wherein the serving radio network controller distinguishes which carrier in the multi-carrier is the carrier for receiving data carried in the enhanced dedicated channel uplink data frame based on the carrier identifier information indicated by "uplink multiplexing information" in the enhanced dedicated channel uplink data frame.

The second step: the serving radio network controller re-orders the data carried in the received enhanced dedicated channel uplink data frame of the identical carrier in the multi-carrier.

As for the first step, further, said "enhanced dedicated channel cell" refers to a cell using enhanced dedicated channel in an uplink direction.

As for the first step, further, said "carrier for receiving data carried in the enhanced dedicated channel uplink data frame"

refers to carrier frequency of the enhanced dedicated channel cell receiving a MAC-i data frame.

As for the first step, further, said "carrier identifier information of a carrier" is used to identify carriers. In dual carriers, the carrier identifier information is a main carrier and an auxiliary carrier. In three carriers, the carrier identifier information is a main carrier, a second carrier and a third carrier. In four carriers, the carrier identifier information is a main carrier, a second carrier, a third carrier and a fourth carrier.

As for the first step, further, in said "enhanced dedicated channel uplink data frame sent by a drift radio network controller of relay party or a node B of sender which has an enhanced dedicated channel cell of frequency layers of any two or more carriers in the multi-carrier", the "uplink multiplexing information" carried in said "enhanced dedicated channel uplink data frame" is carrier identifier information of a carrier for receiving data carried in the enhanced dedicated channel uplink data frame, when the carrier identifier information is that an enhanced dedicated channel cell of frequency layers of any two or more carriers in the multi-carrier is established or added in the node B or drift radio network controller in advance, the serving radio network controller notifies the node B or drift radio network controller of carrier identifier information corresponding to carrier frequency of the enhanced dedicated channel cell. The node B or drift radio network controller records the carrier identifier information and applies it to said "enhanced dedicated channel uplink data frame".

As for the first step, further, in said "enhanced dedicated channel uplink data frame sent by a drift radio network controller of relay party or a node B of sender which only has an enhanced dedicated channel cell of a single carrier frequency layer in the multi-carrier", "uplink multiplexing information" carried in said "enhanced dedicated channel uplink data frame" is "null". As for a drift radio network controller or a node B which only has an enhanced dedicated channel cell of a single carrier frequency layer in the multi-carrier, when the enhanced dedicated channel cell of a single carrier frequency layer in the multi-carrier is established or added in advance, the serving radio network controller does not notify the node B or drift radio network controller of carrier identifier information corresponding to carrier frequency of the enhanced dedicated channel cell. The node B or drift radio network controller does not obtain the carrier identifier information.

The following makes further detailed depiction on the implementing the technical scheme of the present invention in combination with drawings.

The following various embodiments are all directed to a designated terminal using multi-carrier high speed uplink packet access technology.

Figure 3:
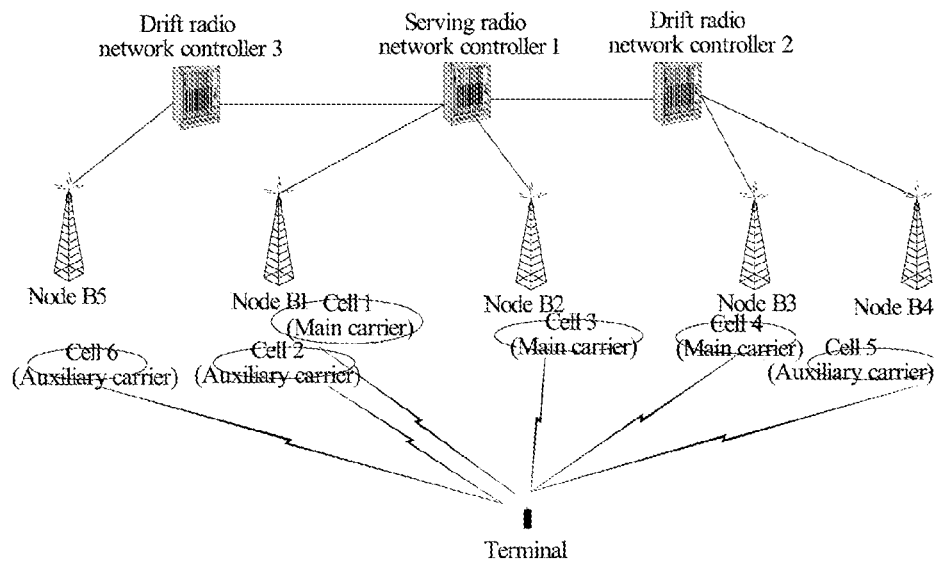
FIG. 3 is a schematic diagram of a complicated scenario using the multi-carrier high speed uplink packet access technology.
Figure 4:
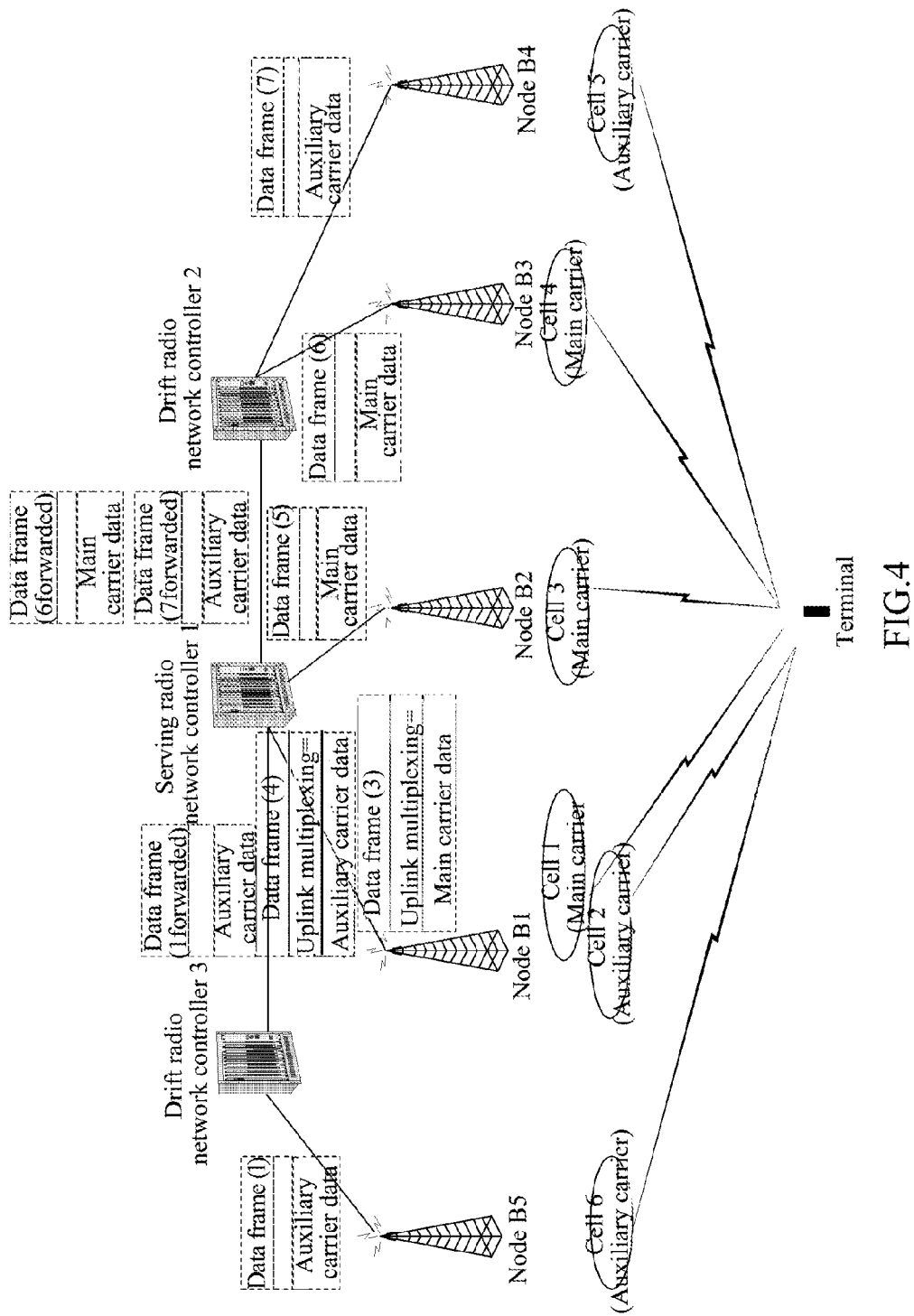
FIG. 4 is a schematic diagram of a process of sending and receiving an enhanced dedicated channel uplink data frame in the scenario as shown in FIG. 3.

Example 1 is processing of node B1 of sender, which occurs in the scene as shown in FIG. 3 with respect to a designated terminal using multi-carrier high speed uplink packet access technology, comprising the processes of setting carrier identifier information of an enhanced dedicated channel uplink data frame and sending to a serving radio network controller 1.

Figure 5:
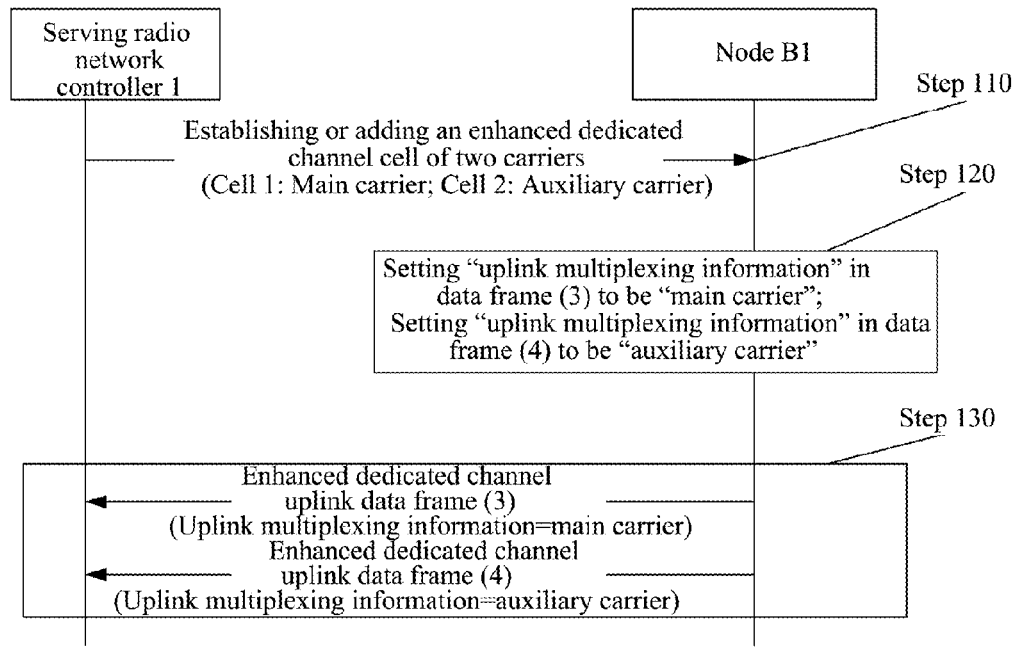
FIG. 5 is a schematic diagram of an implementation process in accordance with the first embodiment.

The processes of Example 1 are shown as FIG. 5, wherein the respective steps are described as follows:

Step 110: when the serving radio network controller 1 establishes or adds in node B1 an enhanced dedicated channel cells (that is, a cell using enhanced dedicated channel in an uplink direction) of two carrier frequency layers of the main carrier and the auxiliary carrier in the multi-carrier in advance, the serving radio network controller 1 notifies node B1 of carrier identifier information corresponding to carrier frequency of the enhanced dedicated channel cell: the carrier identifier information corresponding to carrier frequency of cell 1 in dual carriers is a main carrier; the carrier identifier information corresponding to carrier frequency of cell 2 in dual carriers is an auxiliary carrier. The node B1 records the carrier identifier information.

Step 120: with respect to a designated terminal using multi-carrier high speed uplink access technology, node B1 sets "uplink multiplexing information" in the enhanced dedicated channel uplink data frame to be carrier identifier information of a carrier for receiving data carried in the data frame: when the enhanced dedicated channel cell receiving a MAC-i data frame is cell 1, the carrier identifier information corresponding to carrier frequency of cell 1 is a main carrier, that is, the enhanced dedicated channel uplink data frame is actually the data received at the main carrier, and then node B1 sets "uplink multiplexing information" in the enhanced dedicated channel uplink data frame (No. 3) as "main carrier"; when the enhanced dedicated channel cell receiving a MAC-i data frame is cell 2, the carrier identifier information corresponding to carrier frequency of cell 2 is an auxiliary carrier, that is, the enhanced dedicated channel uplink data frame is actually data received at the auxiliary carrier, and then node B1 sets "uplink multiplexing information" in the enhanced dedicated channel uplink data frame (No. 4) as "auxiliary carrier".

Step 130: node B1 sends the enhanced dedicated channel uplink data frames (Nos. 3 and 4) to the serving radio network controller 1 to which said node B1 belongs.

Example 2 is processing of node B2 of sender, which occurs in the scene as shown in FIG. 3 with respect to a designated terminal using multi-carrier high speed uplink packet access technology, comprising the processes of setting carrier identifier information of the enhanced dedicated channel uplink data frame and sending to a serving radio network controller 1.

Figure 6:
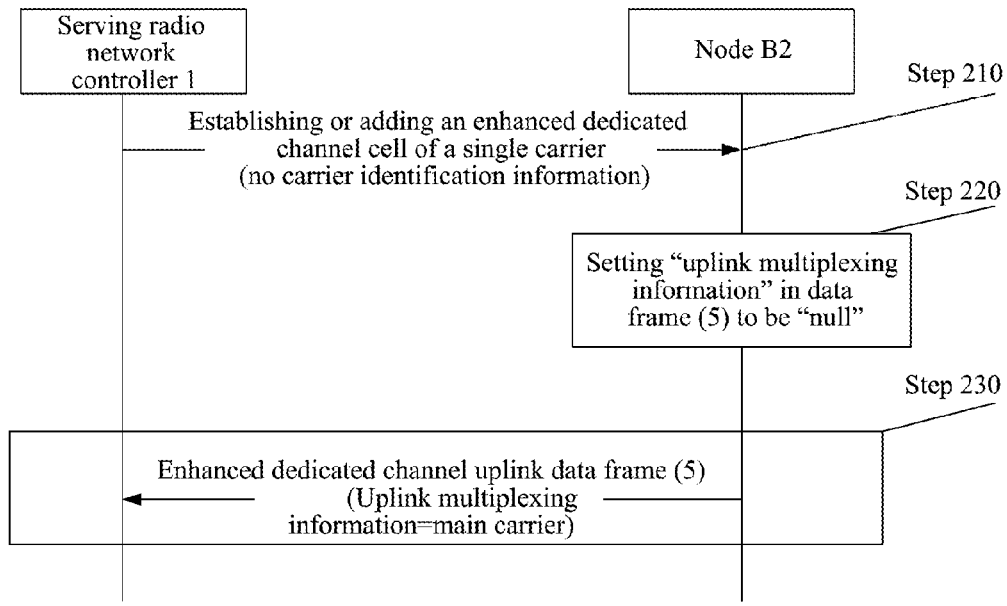
FIG. 6 is a schematic diagram of an implementation process in accordance with the second embodiment.

The processes of Example 2 are shown as FIG. 6, wherein the respective steps are described as follows:

Step 210: when the serving radio network controller 1 establishes or adds in node B2 an enhanced dedicated channel cell (that is, a cell using enhanced dedicated channel in an uplink direction) in advance, since the node B2 only has an enhanced dedicated channel cell of a single carrier frequency layer (that is, a main carrier) in the multi-carrier, the serving radio network controller 1 establishes it in the manner of a traditional single carrier and does not notify node B2 of carrier identifier information corresponding to carrier frequency of the enhanced dedicated channel cell. The node B2 does not obtain the carrier identifier information.

Step 220: with respect to a designated terminal using multi-carrier high speed uplink packet access technology, since node B2 only governs an enhanced dedicated channel cell of a single carrier frequency layer (that is, a main carrier), node B2 sets "uplink multiplexing information" in the enhanced dedicated channel uplink data frame (No. 5) to be "null".

Step 230: node B2 sends the enhanced dedicated channel uplink data frame (No. 5) to the serving radio network controller 1 to which said node B2 belongs.

Example 3 is processing of node B5 of sender, which occurs in the scene as shown in FIG. 3 with respect to a designated terminal using multi-carrier high speed uplink packet access technology, comprising the processes of setting carrier identifier information of the enhanced dedicated channel uplink data frame and sending to a drift radio network controller 3.

Figure 7:
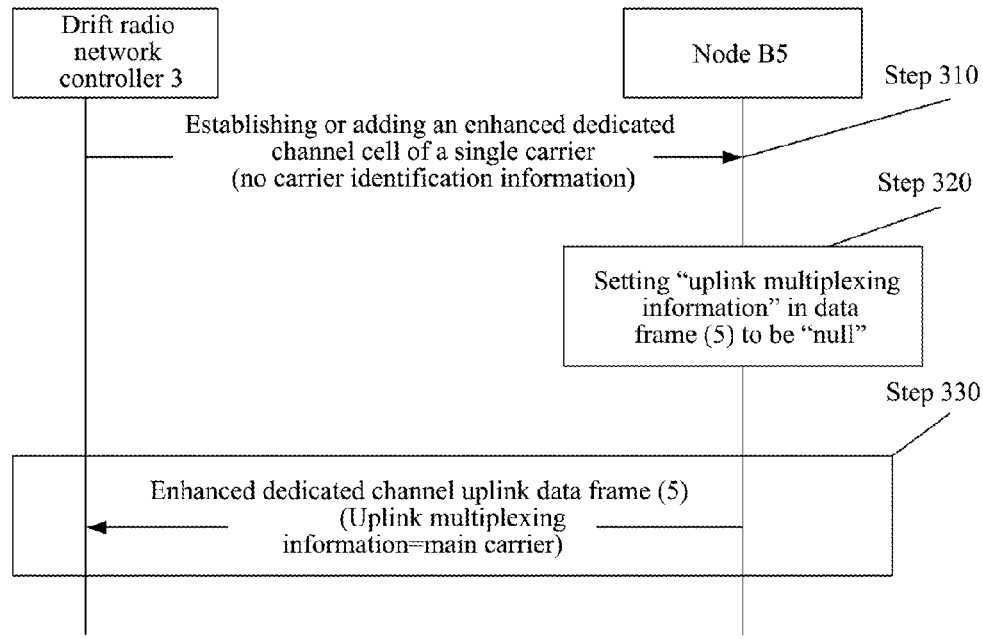
FIG. 7 is a schematic diagram of an implementation process in accordance with the third embodiment.

The processes of Example 3 are shown as FIG. 7, wherein the respective steps are described as follows:

Step 310: when the drift radio network controller 3 establishes or adds in node B5 an enhanced dedicated channel cell (that is, a cell using enhanced dedicated channel in an uplink direction) in advance, since node B5 only has an enhanced dedicated channel cell of a single carrier frequency layer (that is, an auxiliary carrier) in the multi-carrier, the drift radio network controller 3 establishes it in the manner of a traditional single carrier and does not notify node B5 of carrier identifier information corresponding to carrier frequency of the enhanced dedicated channel cell. The node B5 does not obtain the carrier identifier information.

Step 320: with respect to a designated terminal using multi-carrier high speed uplink packet access technology, since node B5 only governs an enhanced dedicated channel cell of a single carrier frequency layer (that is, an auxiliary carrier) in the multi-carrier, node B5 sets "uplink multiplexing information" in the enhanced dedicated channel uplink data frame (No. 1) to be "null".

Step 330: node B5 sends the enhanced dedicated channel uplink data frame (No. 1) to the drift radio network controller 3 to which said node B5 belongs.

Example 4 is processing of a drift radio network controller 3 of relay party, which occurs in the scene as shown in FIG. 3 with respect to a designated terminal using multi-carrier high speed uplink packet access technology, comprising the processes of forwarding and sending to a serving radio network controller 1.

Figure 8:
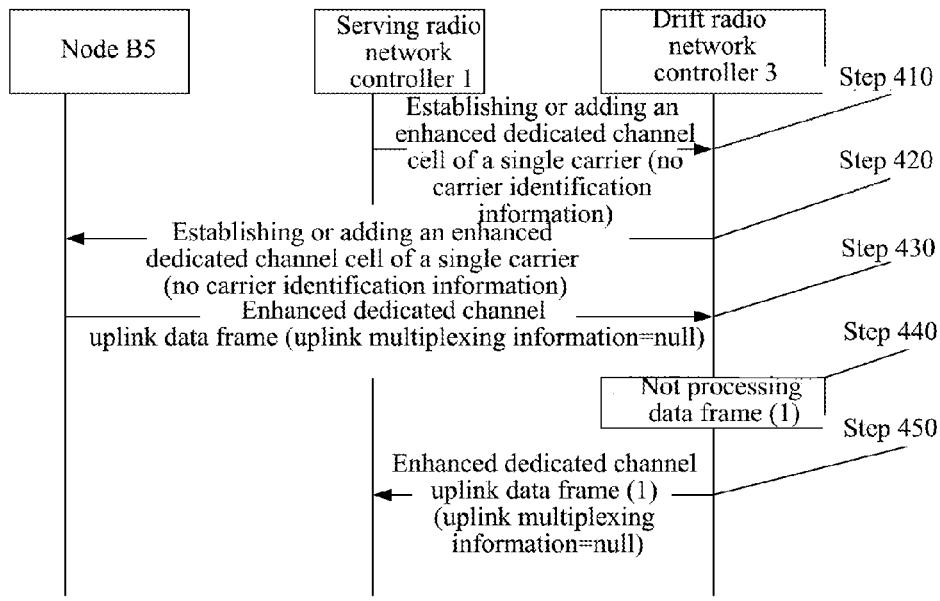
FIG. 8 is a schematic diagram of an implementation process in accordance with the fourth embodiment.

The process of Example 4 is shown as FIG. 8, wherein the respective steps are described as follows:

Step 410: when the serving radio network controller 1 establishes or adds in a drift radio network controller 3 an enhanced dedicated channel cell (that is, a cell using enhanced dedicated channel in an uplink direction) in advance, since the drift radio network controller 3 governs only an enhanced dedicated channel cell of a single carrier frequency layer in the multi-carrier, that is, only governs node B5 and the node B5 only has an enhanced dedicated channel cell of a single carrier frequency layer in the multi-carrier, the serving radio network controller 1 establishes it in the manner of a traditional single carrier and does not notify the drift radio network controller 3 of carrier identifier information corresponding to carrier frequency of the enhanced dedicated channel cell. The drift radio network controller 3 does not obtain the carrier identifier information.

Step 420: with respect to a designated terminal using multi-carrier high speed uplink packet access technology, as for node B5 which only has an enhanced dedicated channel cell of a single carrier frequency layer in the multi-carrier, when an enhanced dedicated channel cell of a single carrier frequency layer in the multi-carrier is established or added, the drift radio network controller 3 does not notify node B5 of carrier identifier information corresponding to carrier frequency of the enhanced dedicated channel cell. The node B5 does not obtain the carrier identifier information.

Step 430: with respect to a designated terminal using multi-carrier high speed packet access technology, the drift radio network controller 3 receives the enhanced dedicated channel uplink data frame (No. 1) sent by node B5, wherein "uplink multiplexing information" of the enhanced dedicated channel uplink data frame is "null".

Step 440: since the drift radio network controller 3 governs only an enhanced dedicated channel cell of a single carrier frequency layer (that is, an auxiliary carrier) in the multi-carrier, that is, it only governs node B5 and the node B5 only has an enhanced dedicated channel cell of a single carrier frequency layer in the multi-carrier, thus the drift radio network controller 3 does not process the received enhanced dedicated channel uplink data frame (No. 1).

Step 450: the drift radio network controller 3 forwards the enhanced dedicated channel uplink data frame (No. 1) to the serving radio network controller 1, wherein "uplink multiplexing information" of the enhanced dedicated channel uplink data frame is "null".

Example 5 is processing of a drift radio network controller 2 of relay party, which occurs in the scene as shown in FIG. 3 with respect to a designated terminal using multi-carrier high speed uplink packet access technology, comprising the processes of setting carrier identifier information of an enhanced dedicated channel uplink data frame and forwarding and sending to a serving radio network controller 1.

Figure 9:
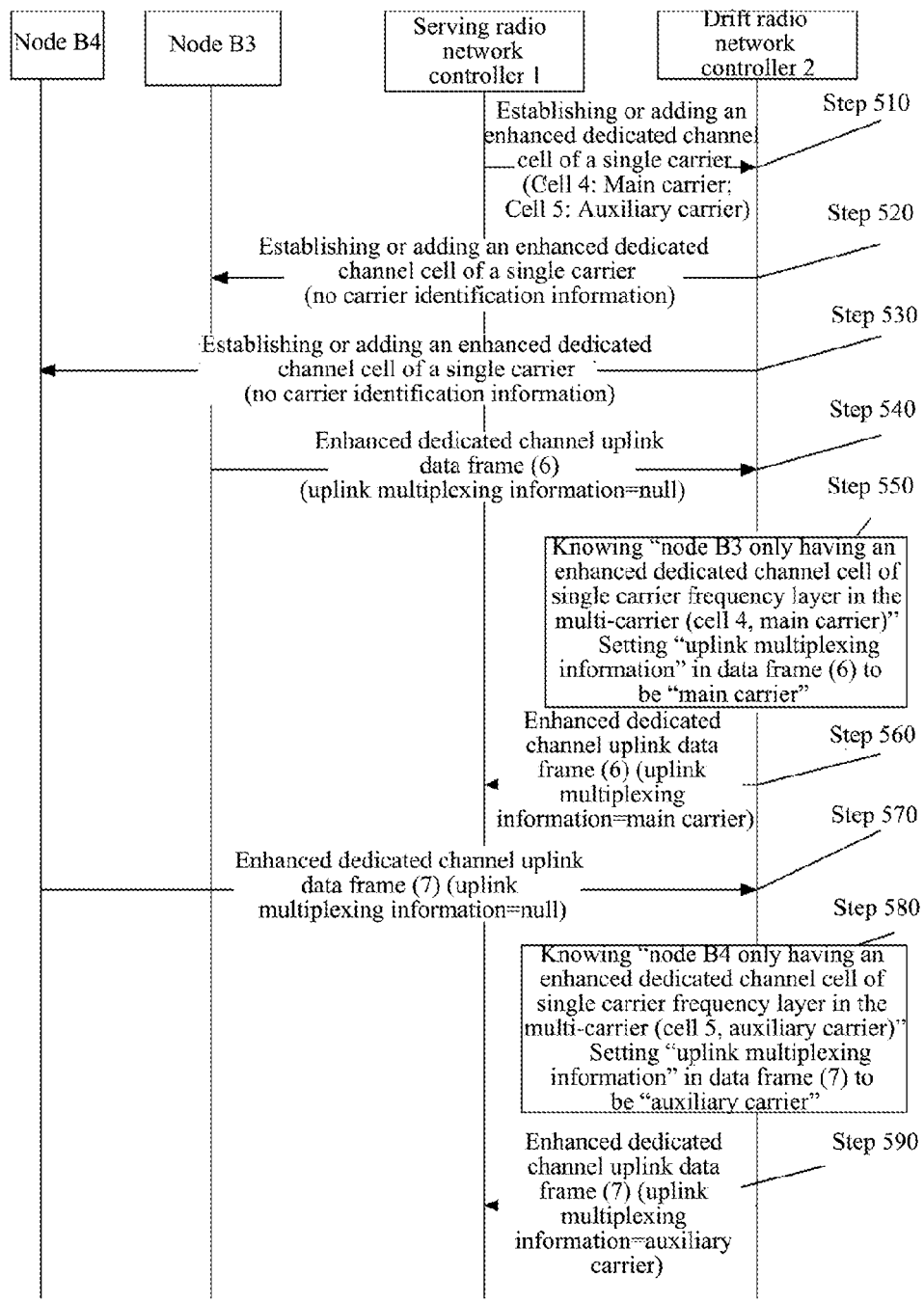
FIG. 9 is a schematic diagram of an implementation process in accordance with the fifth embodiment.

The processes of Example 5 are shown as in FIG. 9, wherein the respective steps are described as follows:

Step 510: when the serving radio network controller 1 establishes or adds in the drift radio network controller 2 an enhanced dedicated channel cell (that is, a cell using enhanced dedicated channel in an uplink direction) in advance, since all the nodes B governed by the drift radio network controller 2 are nodes B of the enhanced dedicated channel cell of a single carrier frequency layer in the multi-carrier but do not belong to an identical carrier frequency layer, that is, the drift radio network controller 2 only governs node B3 and node B4, and the node B3 only has an enhanced dedicated channel cell (cell 4, a main carrier) of a single carrier frequency layer in the multi-carrier and the node B4 only has an enhanced dedicated channel cell (cell 5, an auxiliary cell) of a single carrier frequency in the multi-carrier, but they do not belong to an identical carrier frequency layer (the main carrier and the auxiliary carrier do not belong to the identical carrier frequency layer), falling into the circumstances that an enhanced dedicated channel cell of frequency layers of any two or more carriers in the multi-carrier is established and added, the serving radio network controller 1 notifies the drift radio network controller 2 of carrier identifier information corresponding to carrier frequency of the enhanced dedicated channel cell. The drift radio network controller 2 records the carrier identifier information corresponding to carrier frequency of the enhanced dedicated channel cell, comprising: the node B3 only has the enhanced dedicated channel cell (cell 4, a main carrier) of a single carrier frequency layer in the multi-carrier, and the node B4 only has the enhanced dedicated channel cell (cell 5, an auxiliary carrier) of a single carrier frequency layer in the multi-carrier.

Step 520: with respect to a designated terminal using multi-carrier high speed uplink packet access technology, as for the node B3 which only has an enhanced dedicated channel cell of a single carrier frequency layer in the multi-carrier, the drift radio network controller 2 does not notify the node B3 of carrier identifier information corresponding to carrier frequency of an enhanced dedicated channel cell when the enhanced dedicated channel cell of a single carrier frequency layer in the multi-carrier is established or added. The node B3 does not obtain the carrier identifier information corresponding to the carrier frequency of the enhanced dedicated channel cell.

Step 530: with respect to a designated terminal using multi-carrier high speed uplink packet access technology, as for the node B4 which only has an enhanced dedicated channel cell of a single carrier frequency layer in the multi-carrier, the drift radio network controller 2 does not notify the node B4 of carrier identifier information corresponding to carrier frequency of an enhanced dedicated channel cell when the enhanced dedicated channel cell of a single carrier frequency layer in the multi-carrier is established or added. The node B4 does not obtain the carrier identifier information corresponding to the carrier frequency of the enhanced dedicated channel cell.

Step 540: with respect to a designated terminal using multi-carrier high speed uplink packet access technology, the drift radio network controller 2 receives the enhanced dedicated channel uplink data frame (No. 6) sent by node B3, wherein the "uplink multiplexing information" in the enhanced dedicated channel uplink data frame is "null".

Step 550: on the basis of carrier identifier information corresponding to carrier frequency of the enhanced dedicated channel cell recorded in step 520, the drift radio network controller 2 knows "the node B3 only has the enhanced dedicated channel cell (cell 4, a main carrier) of a single carrier frequency layer in the multi-carrier", falling into the circumstance of an enhanced dedicated channel uplink data frame sent by the node B which only has an enhanced dedicated channel cell of a single carrier frequency layer in the multi-carrier, and all the nodes B governed by the drift radio network controller 2 are nodes B of the enhanced dedicated channel cell of a single carrier frequency layer in the multi-carrier but do not belong to an identical carrier frequency layer, that is, the drift radio network controller 2 only governs node B3 and node B4, and the node B3 only has an enhanced dedicated channel cell (cell 4, a main carrier) of a single carrier frequency layer in the multi-carrier and the node B4 only has an enhanced dedicated channel cell (cell 5, an auxiliary carrier) of a single carrier frequency layer in the multi-carrier, and they do not belong to the identical carrier frequency layer (the main carrier and the auxiliary carrier do not belong to the identical carrier frequency layer). Therefore, the drift radio network controller 2 sets the "uplink multiplexing information" which is "null" in the received enhanced dedicated channel uplink data frame (No. 6) sent by the node B3 to be carrier identifier information of a carrier for receiving data carried in the data frame, that is, sets it as "main carrier", that is, the enhanced dedicated channel uplink data frame actually is the data received at the main carrier, the carrier identifier information corresponding to the carrier frequency of the enhanced dedicated channel cell receiving MAC-i data frame is the main carrier.

Step 560: the drift radio network controller 2 forwards the enhanced dedicated channel uplink data frame (No. 6) to the serving radio network controller 1, wherein "uplink multiplexing information" in the enhanced dedicated channel uplink data frame is "main carrier".

Step 570: with respect to a designated terminal using multi-carrier high speed uplink packet access technology, the drift radio network controller 2 receives the enhanced dedicated channel uplink data frame (No. 7) sent by the node B4, wherein "uplink multiplexing information" in the enhanced dedicated channel uplink data frame is "null".

Step 580: on the basis of carrier identifier information corresponding to the carrier frequency of the enhanced dedicated channel cell recorded in step 510, the drift radio network controller 2 knows "the node B4 only has an enhanced dedicated channel cell (cell 5, an auxiliary carrier) of a single carrier frequency layer in the multi-carrier", falling into the circumstance of the enhanced dedicated channel uplink data frame sent by the node B of the enhanced dedicated channel cell of a single carrier frequency layer in the multi-carrier, and all the nodes B governed in the drift radio network controller 3 are nodes B of the enhanced dedicated channel cell of a single carrier frequency layer in the multi-carrier but do not belong to an identical carrier frequency layer, that is, the drift radio network controller 3 only governs node B3 and node B4, and the node B3 only has an enhanced dedicated channel cell (cell 4, a main carrier) of a single carrier frequency layer in the multi-carrier and the node B4 only has an enhanced dedicated channel cell (cell 5, an auxiliary carrier) of a single carrier frequency layer in the multi-carrier, and they do not belong to an identical carrier frequency layer (the main carrier and the auxiliary carrier do not belong to the identical carrier frequency layer). Therefore, the drift radio network controller 2 sets the "uplink multiplexing information" which is "null" in the received enhanced dedicated channel uplink data frame (No. 6) sent by the node B3 as carrier identifier information of a carrier for receiving data carried in the data frame, that is, sets it as "auxiliary carrier", that is, the enhanced dedicated channel uplink data frame is actually derived from the data received at auxiliary carrier, and the carrier identifier information corresponding to carrier frequency of the enhanced dedicated channel cell receiving MAC-i data frame is the main carrier.

Step 590: the drift radio network controller 2 forwards the enhanced dedicated channel uplink data frame (No. 7) to the serving radio network controller 1, wherein "uplink multiplexing information" in the enhanced dedicated channel uplink data frame is "auxiliary carrier".

Figure 10:
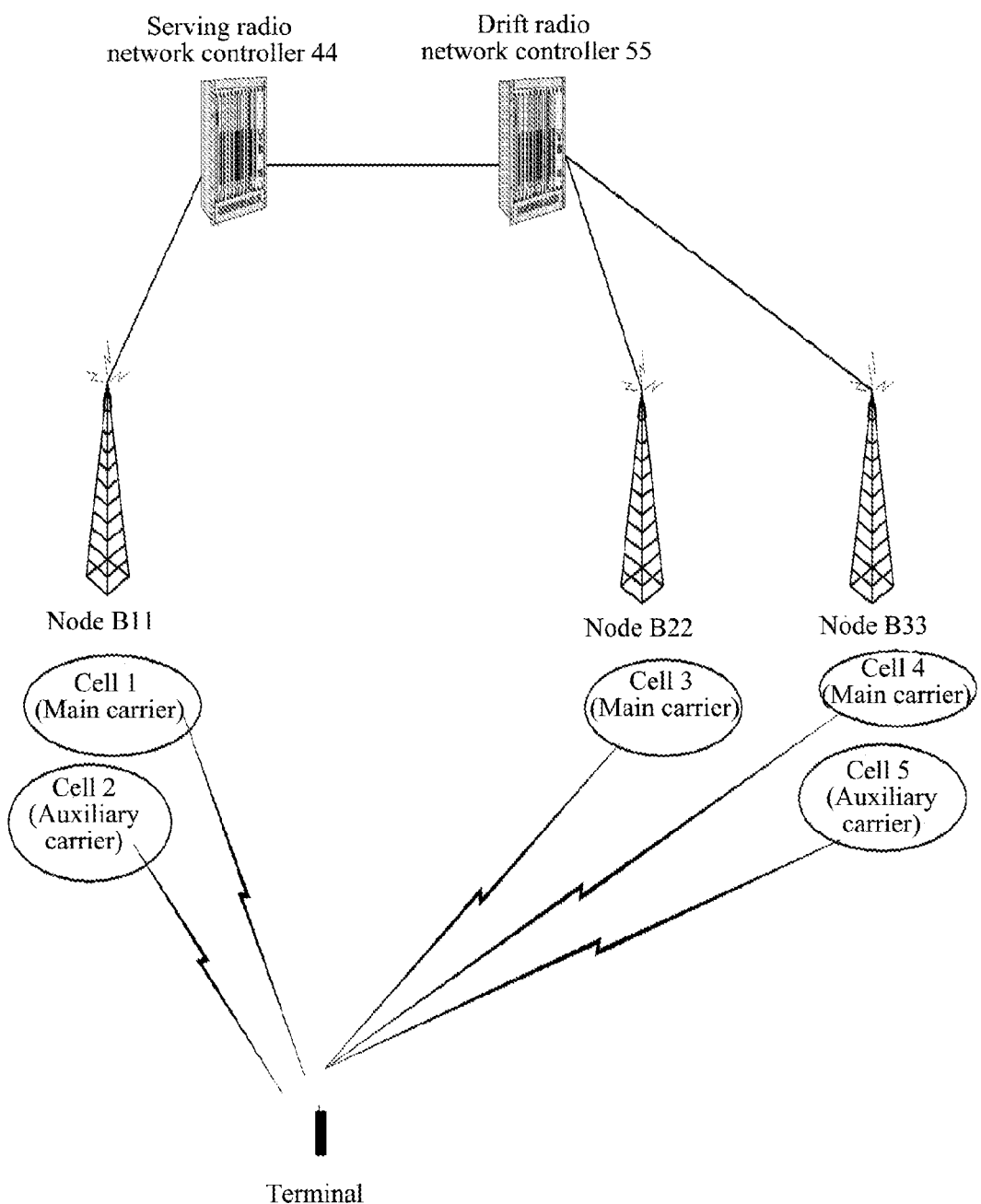
FIG. 10 is a schematic diagram of a complicated scenario using the multi-carrier high speed uplink packet access technology in accordance with the sixth embodiment.
Figure 11:
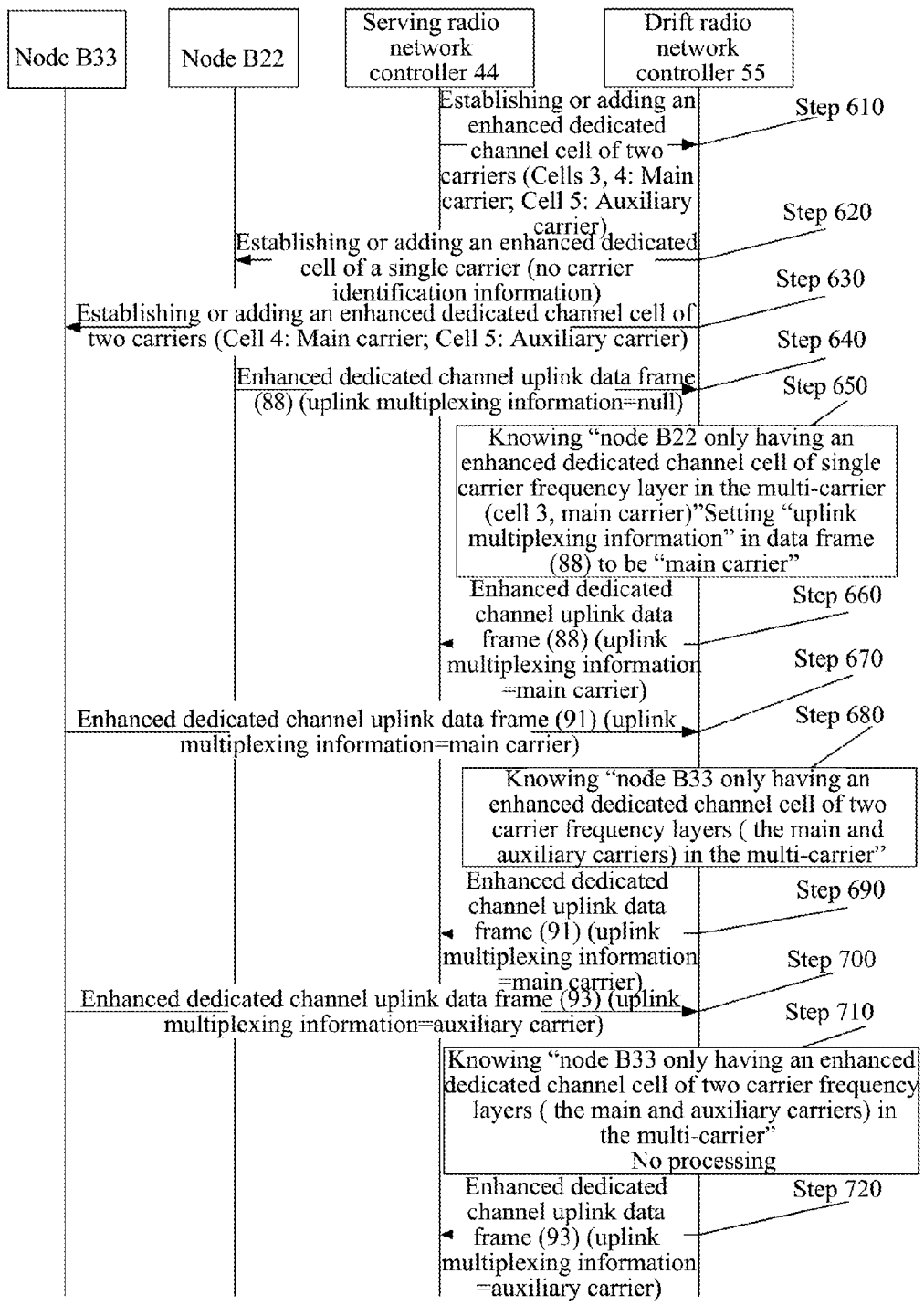
FIG. 11 is a schematic diagram of an implementation process in accordance with the sixth embodiment.

Example 6 is processing of a drift radio network controller of relay party, which occurs in the scene as shown in FIG. 10 with respect to a designated terminal using multi-carrier high speed uplink packet access technology, comprising the processes of setting carrier identifier information of an enhanced dedicated channel uplink data frame and forwarding and sending to a serving radio network controller.

The scene shown in FIG. 10 is as follows: with respect to a designated terminal using multi-carrier high speed uplink packet access technology, the serving radio network controller 44 governs node B11, under the node B11, the cell 1 is of the main carrier and the cell 2 is of the auxiliary carrier; the drift radio network controller 55 governs node B22, under the node B22, the cell 3 is of the main carrier; the drift radio network controller 55 governs node B33, under the node B33, the cell 4 is of the main carrier and the cell 5 is of the auxiliary carrier.

The processes of Example 6 are shown as in FIG. 10, wherein the respective steps are described as follows:

Step 610: when the serving radio network controller 44 establishes or adds in the drift radio network controller 55 an enhanced dedicated channel cell (that is, a cell using enhanced dedicated channel in an uplink direction) in advance, since all the node B governed by the drift radio network controller 55 are not all nodes B of an enhanced dedicated channel cell of a single carrier frequency layer in the multi-carrier, that is, the drift radio network controller 55 governs node B22, wherein the cell 3 in the node B22 is of the main carrier, the node B22 is node B of an enhanced dedicated channel cell of a single carrier frequency layer in the multi-carrier; governs node B33, wherein under the node B33 the cell 4 is of the main carrier, the cell 5 is of the auxiliary carrier, the node B33 is a node B of an enhanced dedicated channel cell of two carrier frequency layers of the main an auxiliary carriers of non single carrier frequency layer in the multi-carrier. Thus the example falls into the circumstances that an enhanced dedicated channel cell of frequency layers of any two or more carriers in the multi-carrier is established and added, so the serving radio network controller 44 notifies the drift radio network controller 55 of carrier identifier information corresponding to carrier frequency of the enhanced dedicated channel cell. The drift radio network controller 55 records the carrier identifier information corresponding to carrier frequency of the enhanced dedicated channel cell, comprising: the node B22 only has an enhanced dedicated channel cell (cell 3, a main carrier) of a single carrier frequency layer in the multi-carrier, and the node B33 only has an enhanced dedicated channel cell of two carrier frequency layers of the main and auxiliary carriers in the multi-carrier (cell 4 is of the main carrier; cell 5 is of the auxiliary carrier).

Step 620: with respect to a designated terminal using multi-carrier high speed uplink packet access technology, as for node B22 which only has an enhanced dedicated channel cell of a single carrier frequency layer in the multi-carrier, the drift radio network controller 55 does not notify the node B22 of carrier identifier information corresponding to carrier frequency of an enhanced dedicated channel cell when the enhanced dedicated channel cell of a single carrier frequency layer in the multi-carrier is established or added. The node B22 does not obtain the carrier identifier information.

Step 630: with respect to a designated terminal using multi-carrier high speed uplink packet access technology, as for node B33 which only has an enhanced dedicated channel cell of frequency layers of any two or more carriers in the multi-carrier, the drift radio network controller 55 notifies the node B33 of carrier identifier information corresponding to carrier frequency of an enhanced dedicated channel cell when the enhanced dedicated channel cell of frequency layers of any two or more carriers in the multi-carrier is established or added. The node B33 records the carrier identifier information and applies it into the "enhanced dedicated channel uplink data frame" which is subsequently sent.

Step 640: with respect to a designated terminal using multi-carrier high speed uplink packet access technology, the drift radio network controller 55 receives the enhanced dedicated channel uplink data frame (No. 88) sent by node B22, wherein the "uplink multiplexing information" in the enhanced dedicated channel uplink data frame is "null".

Step 650: on the basis of carrier identifier information corresponding to carrier frequency of the enhanced dedicated channel cell recorded in step 610, the drift radio network controller 55 knows "the node B22 only has an enhanced dedicated channel cell (cell 3, a main carrier) of a single carrier frequency layer in the multi-carrier", falling into the circumstance of the enhanced dedicated channel uplink data frame sent by the node B which only has an enhanced dedicated channel cell of a single carrier frequency layer in the multi-carrier, and all the nodes B governed by the drift radio network controller 55 are not all nodes B of the enhanced dedicated channel cell of a single carrier frequency layer in the multi-carrier. (The drift radio network controller 55 governs node B22 under which the cell 3 is of the main carrier, the node B22 is a node B of the enhanced dedicated channel cell of a single carrier frequency layer of in the multi-carrier; and the drift radio network controller 55 governs the node B33 under which the cell 4 is of the main carrier and the cell 5 is of the auxiliary carrier, the node B33 is a node B of an enhanced dedicated channel cell of two carrier frequency layers of the main and auxiliary carriers of non-single carrier frequency layer in the multi-carrier). Therefore, the drift radio network controller 55 sets the "uplink multiplexing information" which is "null" in the received enhanced dedicated channel uplink data frame (No. 88) sent by the node B22 as carrier identifier information of a carrier for receiving data carried in the data frame, that is, sets as "main carrier", that is, the enhanced dedicated channel uplink data frame actually is the data received at the main carrier, and the carrier identifier information corresponding to the carrier frequency of the enhanced dedicated channel cell receiving MAC-i data frame is the main carrier.

Step 660: the drift radio network controller 55 forwards the enhanced dedicated channel uplink data frame (No. 88) to the serving radio network controller 44, wherein "uplink multiplexing information" in the enhanced dedicated channel uplink data frame is "main carrier".

Step 670: with respect to a designated terminal using multi-carrier high speed uplink packet access technology, the drift radio network controller 55 receives the enhanced dedicated channel uplink data frame (No. 91) sent by the node B33, wherein "uplink multiplexing information" in the enhanced dedicated channel uplink data frame is "main carrier".

Step 680: on the basis of carrier identifier information corresponding to carrier frequency of the enhanced dedicated channel cell recorded in step 510, the drift radio network controller 55 knows "the node B33 has the enhanced dedicated channel cell (cell 4 is of the main carrier; cell 5 is of the auxiliary carrier) of carrier frequency layers of the main and auxiliary carriers in the multi-carrier", falling into the circumstance of the enhanced dedicated channel uplink data frame sent by the node B of the enhanced dedicated channel cell of two carrier frequency layers of the main and auxiliary carriers in the multi-carrier. Therefore, the drift radio network controller 55 does not process the received enhanced dedicated channel uplink data frame (No. 91).

Step 690: the drift radio network controller 55 forwards the enhanced dedicated channel uplink data frame (No. 91) to the serving radio network controller 44, wherein "uplink multiplexing information" in the enhanced dedicated channel uplink data frame is "main carrier".

Step 700: with respect to a designated terminal using multi-carrier high speed uplink packet access technology, the drift radio network controller 55 receives the enhanced dedicated channel uplink data frame (No. 93) sent by the node B33, wherein "uplink multiplexing information" in the enhanced dedicated channel uplink data frame is "auxiliary carrier".

Step 710: according to carrier identifier information corresponding to the carrier frequency of the enhanced dedicated channel cell recorded in step 510, the drift radio network controller 55 knows "the node B33 has an enhanced dedicated channel cell (cell 4 is of the main carrier; cell 5 is of the auxiliary carrier) of two carrier frequency layers of the main and auxiliary carriers in the multi-carrier", falling into the circumstance of the enhanced dedicated channel uplink data frame sent by the node B of the enhanced dedicated channel cell of frequency layers of any two or more carriers in the multi-carrier. Therefore, the drift radio network controller 55 does not process the received enhanced dedicated channel uplink data frame (No. 93).

Step 720: the drift radio network controller 55 forwards the enhanced dedicated channel uplink data frame (No. 93) to the serving radio network controller 44, wherein "uplink multiplexing information" in the enhanced dedicated channel uplink data frame is "auxiliary carrier".

Example 7 is processing of a drift radio network controller 1 of the receiver, which occurs in the scene as shown in FIG. 3 with respect to a designated terminal using multi-carrier high speed uplink packet access technology, comprising the processes of receiving the enhanced dedicated channel uplink data frame sent by the drift radio network controller of a relay party or the node B of a sender and identifying a carrier for receiving the enhanced dedicated channel uplink data frame and re-ordering.

Figure 12:
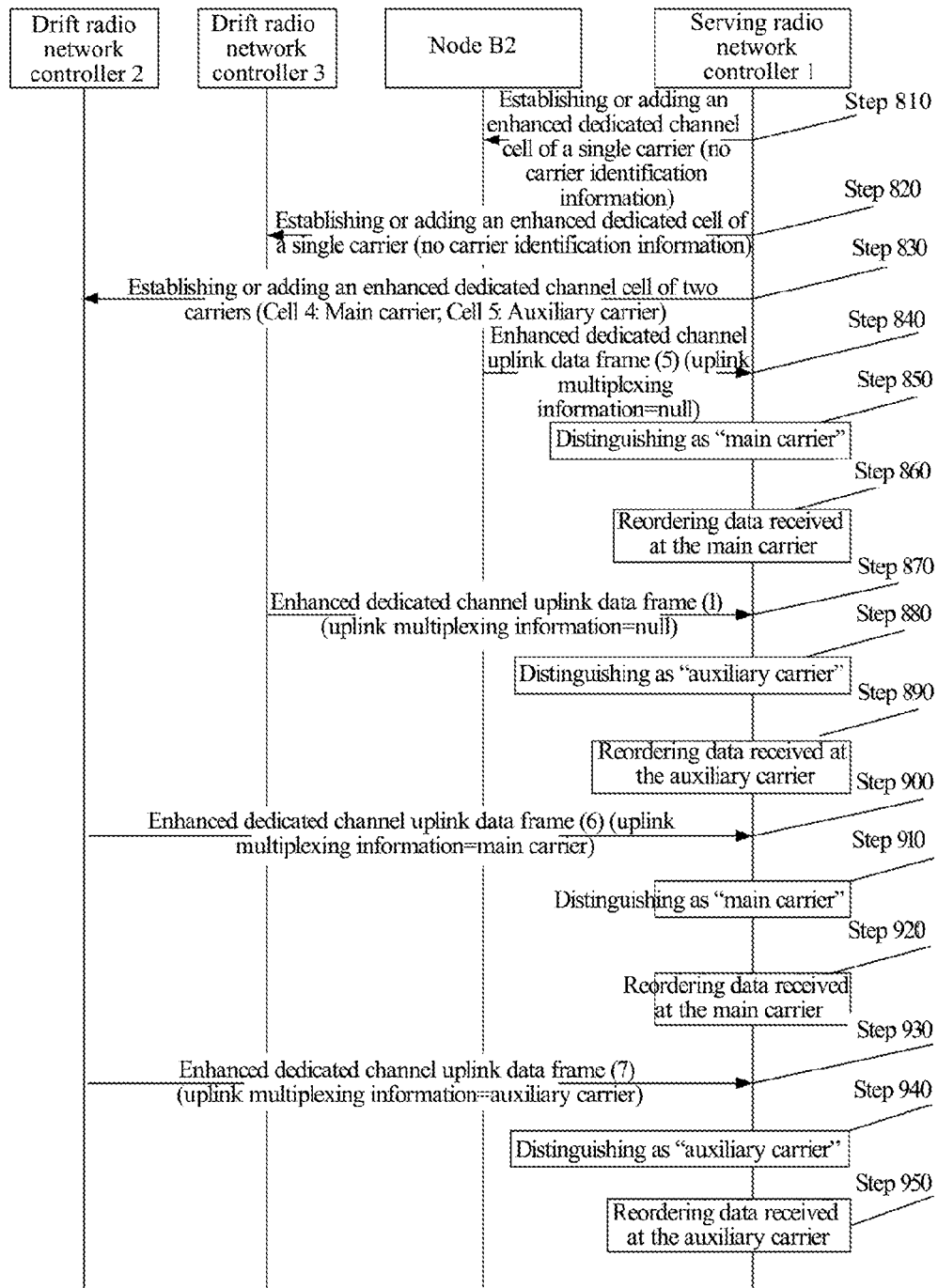
FIG. 12 is a schematic diagram of an implementation process in accordance with the seventh embodiment.

The processes of Example 7 are shown as in FIG. 12, wherein the respective steps are described as follows:

Step 810: with respect to a designated terminal using multi-carrier high speed uplink packet access technology, when the serving radio network controller 1 establishes or adds in the node B2 an enhanced dedicated channel cell (that is, a cell using enhanced dedicated channel in an uplink direction), since the node B2 only has an enhanced dedicated channel cell (cell 3) of a single carrier frequency layer (that is, a main carrier) in the multi-carrier, the serving radio network controller 1 establishes it in the manner of a traditional single carrier, the serving radio network controller 1 does not notify the node B2 of carrier identifier information corresponding to carrier frequency of the enhanced dedicated channel cell. The node B2 does not obtain the information. The carrier identifier information corresponding to carrier frequency of the enhanced dedicated channel cell recorded by the serving radio network controller 1 when the enhanced dedicated channel cell of a single carrier frequency layer in the multi-carrier is established or added, comprises: "the node B2 only has an enhanced dedicated channel cell of a single carrier frequency layer in the multi-carrier (cell 3, a main carrier)".

Step 820: with respect to a designated terminal using multi-carrier high speed uplink packet access technology, when the serving radio network controller 1 establishes or adds in the drift radio network controller 3 an enhanced dedicated channel cell (that is, a cell using enhanced dedicated channel in an uplink direction), since the drift radio network controller 3 only has an enhanced dedicated channel cell (cell 6) of a single carrier frequency layer (that is, an auxiliary carrier) in the multi-carrier, the serving radio network controller 1 establishes it in the manner of a traditional single carrier, the serving radio network controller 1 does not notify the drift radio network controller 3 of carrier identifier information corresponding to the carrier frequency of the enhanced dedicated channel cell. The drift radio network controller 3 does not obtain the information. The carrier identifier information corresponding to carrier frequency of the enhanced dedicated channel cell recorded by the serving radio network controller 1 when the enhanced dedicated channel cell of a single carrier frequency layer in the multi-carrier is established or added comprises: "the drift radio network controller 3 only has an enhanced dedicated channel cell of a single carrier frequency layer in the multi-carrier (cell 6, an auxiliary carrier)".

Step 830: with respect to a designated terminal using multi-carrier high speed uplink packet access technology, when the serving radio network controller 1 establishes or adds in the drift radio network controller 2 an enhanced dedicated channel cell (that is, a cell using enhanced dedicated channel in an uplink direction), since all the nodes B governed by the drift radio network controller 2 are nodes B of an enhanced dedicated channel cell of a single carrier frequency layer in the multi-carrier but do not belong to an identical carrier frequency layer, falling into the circumstance that an enhanced dedicated channel cell of frequency layers of any two or more carriers in the multi-carrier is established or added, the serving radio network controller 1 notifies the drift radio network controller 2 of carrier identifier information corresponding to carrier frequency of the enhanced dedicated channel cell. The drift radio network controller 2 records the carrier identifier information corresponding to the carrier frequency of the enhanced dedicated channel cell and applies it to the "enhanced dedicated channel uplink data frame" which is subsequently sent, comprising: the node B3 only having an enhanced dedicated channel cell of a single carrier frequency layer in the multi-carrier (cell 4, a main carrier), and the node B4 only having an enhanced dedicated channel cell of a single carrier frequency layer in the multi-carrier (cell 5, an auxiliary carrier).

Step 840: with respect to a designated terminal using multi-carrier high speed uplink packet access technology, the serving radio network controller 1 receives the enhanced dedicated channel uplink data frame (No. 5) sent by the node B2 of the sender which only has the enhanced dedicated channel cell of a single carrier frequency layer in the multi-carrier, wherein the "uplink multiplexing information" in the enhanced dedicated channel uplink data frame is "null".

Step 850: on the basis of carrier identifier information corresponding to carrier frequency of the enhanced dedicated channel cell recorded when the enhanced dedicated channel cell of a single carrier frequency layer in the multi-carrier is established or added in advance, that is, the information that "the node B2 only has an enhanced dedicated channel cell of a single carrier frequency layer in the multi-carrier (cell 3, a main carrier)", the serving radio network controller distinguishes that the carrier for receiving data carried in the enhanced dedicated channel uplink data frame is the main carrier.

Step 860: re-ordering the data carried in the enhanced dedicated channel uplink data frame received at the main carrier.

Step 870: with respect to a designated terminal using multi-carrier high speed uplink packet access technology, the serving radio network controller 1 receives an enhanced dedicated channel uplink data frame (No. 1) sent by the drift radio network controller 3 of a relay party which only has an enhanced dedicated channel cell of a single carrier frequency layer in the multi-carrier, wherein "uplink multiplexing information" in the enhanced dedicated channel uplink data frame is "null".

Step 880: on the basis of carrier identifier information corresponding to carrier frequency of an enhanced dedicated channel cell recorded when the enhanced dedicated channel cell of a single carrier frequency layer in the multi-carrier is established or added in advance, that is, the information that "the drift radio network controller 3 only has an enhanced dedicated channel cell of a single carrier frequency layer in the multi-carrier (cell 6, an auxiliary carrier)", the serving radio network controller distinguishes that the carrier for receiving data carried in the enhanced dedicated channel uplink data frame is the auxiliary carrier.

Step 890: re-ordering the data carried in the enhanced dedicated channel uplink data frame received at the auxiliary carrier.

Step 900: with respect to a designated terminal using multi-carrier high speed uplink packet access technology, the serving radio network controller 1 receives the enhanced dedicated channel uplink data frame (No. 6) sent by the drift radio network controller 2 of the relay party which has an enhanced dedicated channel cell of frequency layers of any two or more carriers in the multi-carrier, wherein "uplink multiplexing information" in the enhanced dedicated channel uplink data frame is "main carrier".

Step 910: on the basis of the carrier identifier information "main carrier" indicated by "uplink multiplexing information" in the enhanced dedicated channel uplink data frame (No. 6), the serving radio network controller 1 distinguishes that a carrier for receiving data carried in the enhanced dedicated channel uplink data frame is the main carrier.

Step 920: re-ordering the data carried in the enhanced dedicated channel uplink data frame received at the main carrier.

Step 930: with respect to a designated terminal using multi-carrier high speed uplink packet access technology, the serving radio network controller 1 receives the enhanced dedicated channel uplink data frame (No. 7) sent by the drift radio network controller 2 of the relay party which has an enhanced dedicated channel cell of frequency layers of any two or more carriers in the multi-carrier, wherein "uplink multiplexing information" of the enhanced dedicated channel uplink data frame is "auxiliary carrier".

Step 940: on the basis of the carrier identifier information "auxiliary carrier" indicated by "uplink multiplexing information" in the enhanced dedicated channel uplink data frame (No. 6), the serving radio network controller 1 distinguishes that a carrier for receiving data carried in the enhanced dedicated channel uplink data frame is the auxiliary carrier.

Step 950: re-ordering the data carried in the enhanced dedicated channel uplink data frame received at the auxiliary carrier.

The above respective examples of dual carriers can be extended to multi-carrier such as three carriers and four carriers. The followings make explanations on Example 8.

Figure 13:
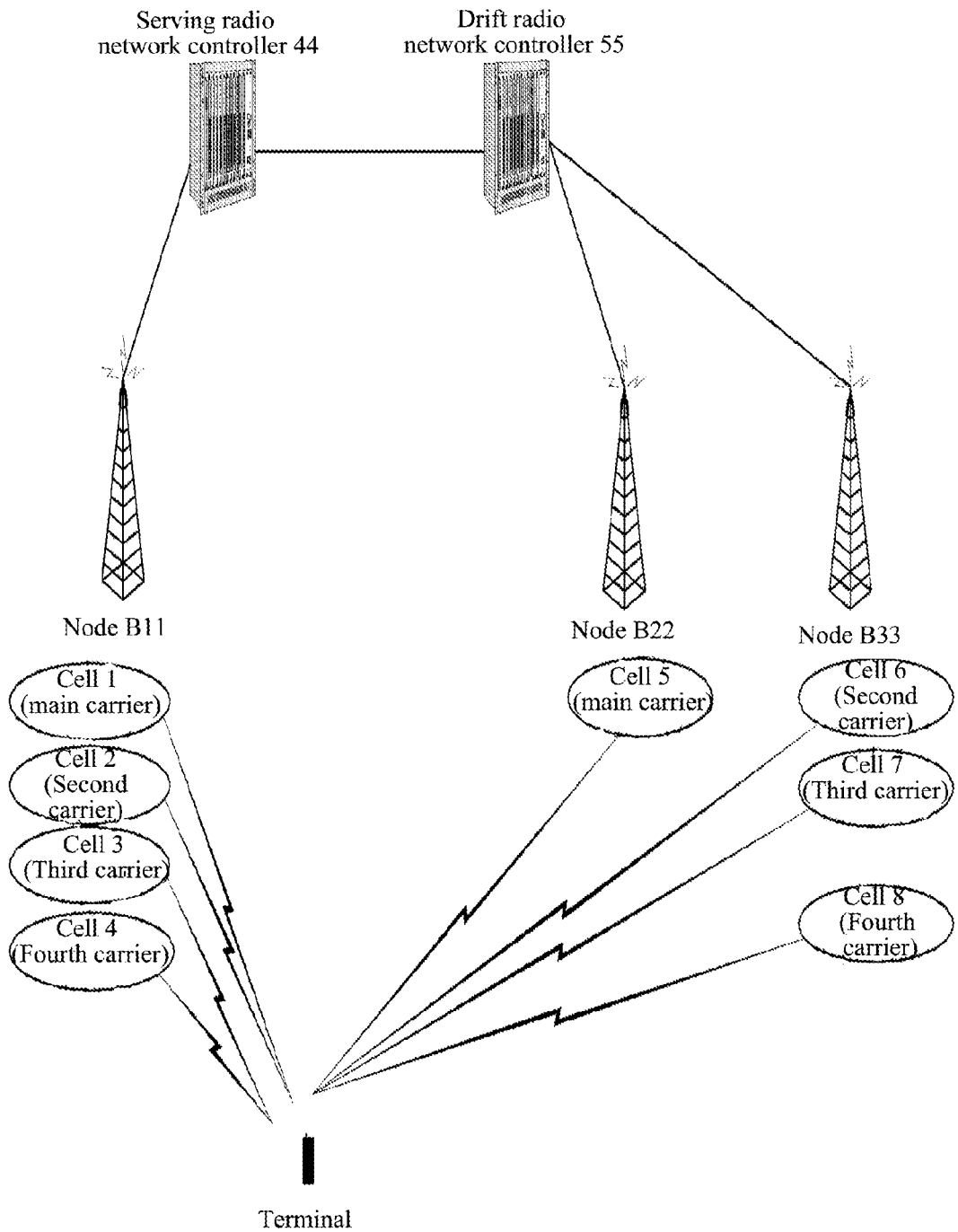
FIG. 13 is a schematic diagram of a complicated scenario using the multi-carrier high speed uplink packet access technology in accordance with the eighth embodiment.

Example 8 is processing of a drift radio network controller of a relay party, which occurs in the scene as shown in FIG. 13 with respect to a designated terminal using multi-carrier high speed uplink packet access technology, comprising the processes of setting carrier identifier information of an enhanced dedicated channel uplink data frame and forwarding and sending it to a serving radio network controller.

The scene shown in FIG. 13 is as follows: with respect to a designated terminal using multi-carrier high speed uplink packet access technology, the serving radio network controller 44 governs node B11 which is of four carriers, under the node B11, cell 1 is of a main carrier, cell 2 is of a second carrier, cell 3 is of a third carrier, and the cell 4 is of a fourth carrier; the drift radio network controller 55 governs node B22, under the node B22, cell 5 is of a main carrier, which is of a single carrier; the drift radio network controller 55 governs node B33 which is of three carriers, under the node B33, cell 6 is of a second carrier, cell 7 is of a third carrier, and cell 8 is of a fourth carrier.

Figure 14:
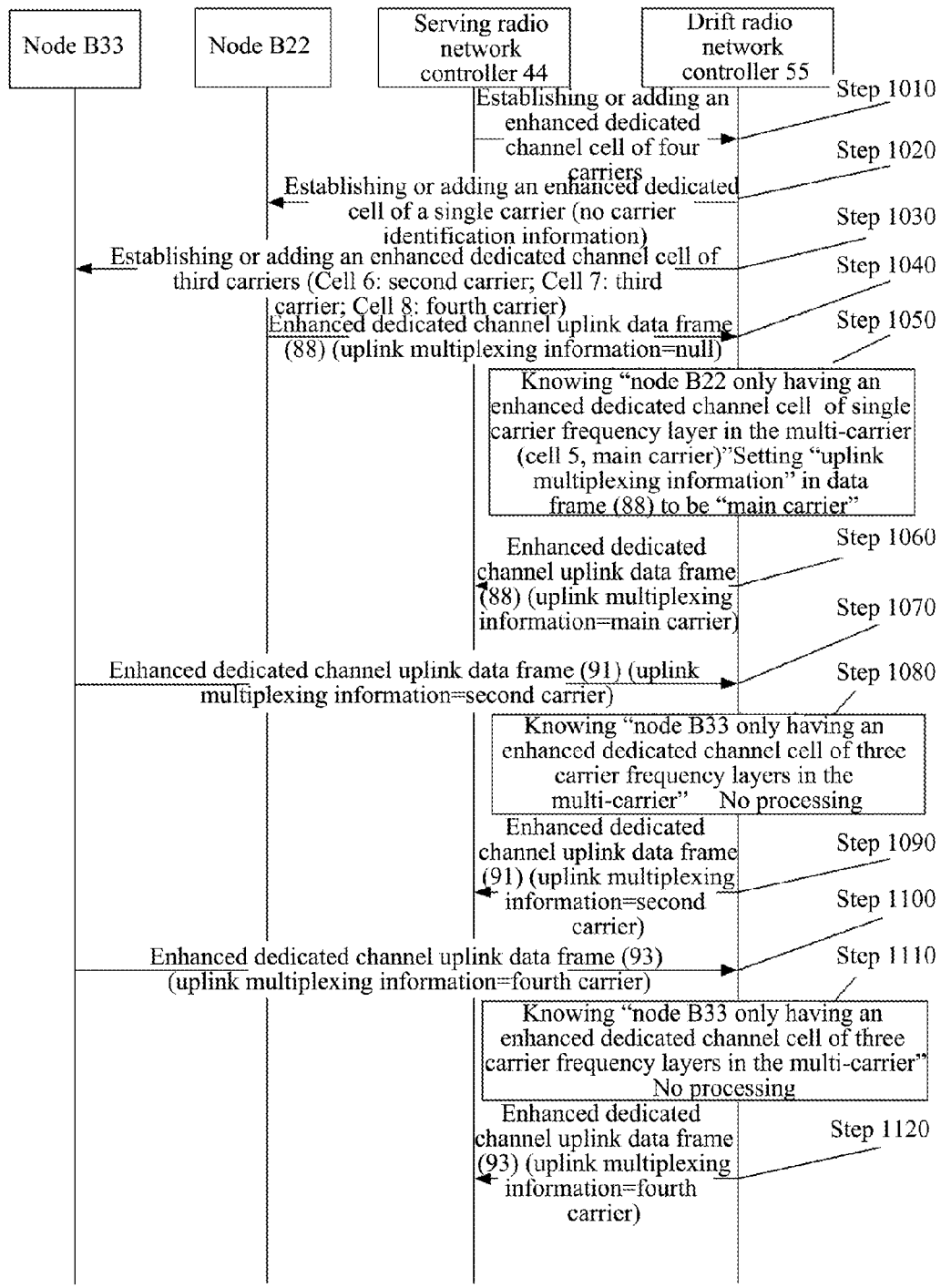
FIG. 14 is a schematic diagram of an implementation process in accordance with the eighth embodiment.

The processes of Example 8 are shown as in FIG. 14, wherein the respective steps are described as follows:

Step 1010: when the serving radio network controller 44 establishes or adds in the drift radio network controller 55 an enhanced dedicated channel cell (that is, a cell using enhanced dedicated channel cell in uplink direction) in advance, since all the nodes B governed by the drift radio network controller 55 are not all nodes B of an enhanced dedicated channel cell of a single carrier frequency layer in the multi-carrier, falling into the circumstance that an enhanced dedicated channel cell of frequency layers of any two or more carriers in the multi-carrier is established or added, the serving radio network controller 44 notifies the drift radio network controller 55 of carrier identifier information corresponding to the carrier frequency of the enhanced dedicated channel cell. The drift radio network controller 55 records the carrier identifier information corresponding to the carrier frequency of the enhanced dedicated channel cell, comprising: node B22 only having an enhanced dedicated channel cell of a single carrier frequency layer in the multi-carrier (cell 5, a main carrier), and node B33 only having an enhanced dedicated channel cell of three carrier frequency layers in the multi-carrier (cell 6 is of a second carrier; cell 7 is of a third carrier; cell 8 is of a fourth carrier).

Step 1020: with respect to a designated terminal using multi-carrier high speed uplink packet access technology, as for node B22 which only has an enhanced dedicated channel cell of a single carrier frequency layer in the multi-carrier, the drift radio network controller 55 does not notify the node B22 of carrier identifier information corresponding to the carrier frequency of the enhanced dedicated channel cell when the enhanced dedicated channel cell of a single carrier frequency layer in the multi-carrier is established or added. The node B22 does not obtain the carrier identifier information.

Step 1030: with respect to a designated terminal using multi-carrier high speed uplink packet access technology, as for node B33 which has an enhanced dedicated channel cell of frequency layers of any two or more carriers in the multi-carrier, the drift radio network controller 55 notifies the node B33 of carrier identifier information corresponding to the carrier frequency of the enhanced dedicated channel cell when the enhanced dedicated channel cell of frequency layers of any two or more carriers in the multi-carrier is established or added, comprising: node B33 having an enhanced dedicated channel of three carrier frequency layers in the multi-carrier (cell 6 is of a second carrier; cell 7 is of a third carrier; cell 8 is of a fourth carrier). The node B33 records the carrier identifier information and applies it into the "enhanced dedicated channel uplink data frame" which is subsequently sent.

Step 1040: with respect to a designated terminal using multi-carrier high speed uplink packet access technology, the drift radio network controller 55 receives the enhanced dedicated channel uplink data frame (No. 88) sent by node B22, wherein the "uplink multiplexing information" in the enhanced dedicated channel uplink data frame is "null".

Step 1050: on the basis of carrier identifier information corresponding to the carrier frequency of the enhanced dedicated channel cell recorded in step 1010, the drift radio network controller 55 knows "the node B22 only has an enhanced dedicated channel cell of a single carrier frequency layer in the multi-carrier (cell 5, a main carrier)", falling into the circumstance of the enhanced dedicated channel uplink data frame sent by the node B which only has the enhanced dedicated channel cell of a single carrier frequency layer in the multi-carrier, and all the nodes B governed by the drift radio network controller 55 are not all nodes B of the enhanced dedicated channel cell of a single carrier frequency layer in the multi-carrier. Therefore, the drift radio network controller 55 sets the "uplink multiplexing information" which is "null" in the received enhanced dedicated channel uplink data frame (No. 88) sent by the node B22 as carrier identifier information of a carrier for receiving data carried in the data frame, that is, sets as "main carrier", that is, the enhanced dedicated channel uplink data frame is actually derived from the data received at main carrier, the carrier identifier information corresponding to the carrier frequency of the enhanced dedicated channel cell receiving MAC-i data frame is a main carrier.

Step 1060: the drift radio network controller 55 forwards an enhanced dedicated channel uplink data frame (No. 88) to the serving radio network controller 44, wherein "uplink multiplexing information" in the enhanced dedicated channel uplink data frame is "main carrier". The serving radio network controller 44, on the basis of the carrier identifier information "main carrier" indicated by "uplink multiplexing information" in the enhanced dedicated channel uplink data frame (No. 88), judges that the carrier for receiving data carried in the enhanced dedicated channel uplink data frame is the main carrier and re-orders the data carried in the enhanced dedicated channel uplink data frame received at the main carrier.

Step 1070: with respect to a designated terminal using multi-carrier high speed uplink packet access technology, the drift radio network controller 55 receives the enhanced dedicated channel uplink data frame (No. 91) sent by the node B33, wherein "uplink multiplexing information" in the enhanced dedicated channel uplink data frame is "a second carrier".

Step 1080: on the basis of carrier identifier information corresponding to the carrier frequency of the enhanced dedicated channel cell recorded in step 1010, the drift radio network controller 55 knows "the node B33 has an enhanced dedicated channel cells of the three carrier frequency layers in the multi-carrier (cell 6 is of a second carrier; cell 7 is of a third carrier; cell 8 is of a fourth carrier)", falling into the circumstance of the enhanced dedicated channel uplink data frame sent by the node B of the enhanced dedicated channel cell of frequency layers of any two or more carriers in the multi-carrier. Therefore, the drift radio network controller 55 does not process the received enhanced dedicated channel uplink data frame (No. 91).

Step 1090: the drift radio network controller 55 forwards an enhanced dedicated channel uplink data frame (No. 91) to the serving radio network controller 44, wherein "uplink multiplexing information" in the enhanced dedicated channel uplink data frame is "a second carrier".

Step 1100: with respect to a designated terminal using multi-carrier high speed uplink packet access technology, the drift radio network controller 55 receives the enhanced dedicated channel uplink data frame (No. 93) sent by node B33, wherein "uplink multiplexing information" in the enhanced dedicated channel uplink data frame is "a fourth carrier".

Step 1110: according to the carrier identifier information corresponding to the carrier frequency of the enhanced dedicated channel cell recorded in step 1010, the drift radio network controller 55 knows "the node B33 has an enhanced dedicated channel cell of three carrier frequency layers in the multi-carrier (cell 6 is of a second carrier; cell 7 is of a third carrier; cell 8 is of a fourth carrier)", falling into the circumstance of the enhanced dedicated channel uplink data frame sent by the node B which has an enhanced dedicated channel cell of frequency layers of any two or more carriers in the multi-carrier. Therefore, the drift radio network controller 55 does not process the received enhanced dedicated channel uplink data frame (No. 93).

Step 1120: the drift radio network controller 55 forwards the enhanced dedicated channel uplink data frame (No. 93) to the serving radio network controller 44, wherein "uplink multiplexing information" in the enhanced dedicated channel uplink data frame is "a fourth carrier". The serving radio network controller 44, on the basis of carrier identifier information "a fourth carrier" indicated by "uplink multiplexing information" in the enhanced dedicated channel uplink data frame (No. 93), distinguishes that a carrier for receiving data carried in the enhanced channel uplink data frame is a fourth carrier and re-orders the data carried in the enhanced dedicated channel uplink data frame received at the fourth carrier.

To sum up, the present invention provides a method for sending and receiving multi-carrier enhanced dedicated channel data, wherein, by setting and sending carrier identifier information of an enhanced dedicated channel uplink data frame by node B of sender; setting and sending carrier identifier information of an enhanced dedicated channel uplink data frame by a drift radio network controller of relay party; performing receiving and carrier identifier by the serving radio network controller of receiver, the carrier for receiving data carried in the enhanced dedicated channel uplink data frames can be correctly recognized and distinguished, ensuring that the data carried in the enhanced dedicated channel uplink data frame can be reordered correctly. In the limited configuration information of prior art, when an enhanced dedicated channel cell of frequency layers of any two or more carriers in the multi-carrier is established or added in the drift radio network controller as recorded in advance by the drift radio network controller, the serving radio network controller notifies the drift radio network controller of carrier identifier information corresponding to the carrier frequency of the enhanced dedicated channel cell, and carrier identifier information corresponding to the carrier frequency of the enhanced dedicated channel cell recorded when the serving network controller establishes or adds an enhanced dedicated channel cell of a single carrier frequency layer in the multi-carrier as recorded in advance by the serving radio network controller, whereby, with the information recorded in advance, "uplink multiplexing information" which is "null" in the enhanced dedicated channel uplink data frame is corrected to be actual carrier identifier information to solve the processing defects with respect to sending and receiving the enhanced dedicated channel uplink data frame in the prior art, so that the carrier at which the data carried in the enhanced dedicated channel uplink data frame is received can be correctly recognized and distinguished, ensuring that the data carried in the enhanced dedicated channel uplink data frame can be reordered correctly, ensuring that the actual service data of terminal can be sent correctly, and ensuring that the dual carrier high speed uplink packet access technology is practicable.

A person having ordinary skill in the art can appreciate that all or part of the steps in the method can instruct the relevant hardware to accomplish by program, the program can be stored in the computer readable storage medium, such as ROM, disc or optic disc. Preferably, all or part of the steps in the above examples can also be achieved using one or more integrated circuits. Correspondingly, the various modules/units in the above examples can be achieved in the manner of hardware, or can be achieved in the manner of software functional modules. The present invention is not limited to the combination of software and hardware in any specific manner.

INDUSTRIAL APPLICABILITY

In the present invention, when the enhanced dedicated channel cell of frequency layers of any two or more carriers in the multi-carrier is established or added in the drift radio network controller as recorded in advance by the drift radio network controller, the serving radio network controller notifies a drift radio network controller of carrier identifier information corresponding to the carrier frequency of the enhanced dedicated channel cell, and carrier identifier information corresponding to the carrier frequency of the enhanced dedicated channel cell recorded when the service network controller establishes or adds the enhanced dedicated channel cell of a single carrier frequency layer in the multi-carrier as recorded in advance by the serving radio network controller, whereby, with the information recorded in advance, "uplink multiplexing information" which is "null" in the enhanced dedicated channel uplink data frame is corrected to be actual carrier identifier information to solve the processing defects with respect to sending and receiving an enhanced dedicated channel uplink data frame in the prior art, so that the carrier at which the data carried in the enhanced dedicated channel uplink data frame is received can be correctly recognized and distinguished, ensuring that the data carried in the enhanced dedicated channel uplink data frame can be reordered correctly, ensuring that the actual service data of terminal can be sent correctly, and ensuring that the dual carrier high speed uplink packet access technology is practicable.

What is claimed is:

1. A method for transmitting multi-carrier enhanced dedicated channel data, comprising a first sending step and a first receiving step, wherein:

the first sending step comprises: when a node B only has an enhanced dedicated channel cell of a single carrier frequency layer in multi-carrier, the node B setting "uplink multiplexing information" in an enhanced dedicated channel uplink data frame to be "null" and sending the enhanced dedicated channel uplink data frame to a serving radio network controller;

the first receiving step comprises: the serving radio network controller receiving the enhanced dedicated channel uplink data frame sent by the node B of a sender which only has the enhanced dedicated channel cell of a single carrier frequency layer in the multi-carrier, the serving radio network controller distinguishing which carrier in the multi-carrier is a carrier for receiving data carried in the enhanced dedicated channel uplink data frame based on carrier identifier information corresponding to a carrier frequency of an enhanced dedicated channel cell recorded when the enhanced dedicated channel cell of a single carrier frequency layer in the multi-carrier is established or added in advance;

or the method comprising: a second sending step, a relaying step and a second receiving step:

the second sending step comprising: when a node B only has an enhanced dedicated channel cell of a single carrier frequency layer in the multi-carrier, the node B setting "uplink multiplexing information" in the enhanced dedicated channel uplink data frame to be "null" and sending the enhanced dedicated channel uplink data frame to a drift radio network controller;

the relaying step comprising: the drift radio network controller receiving the enhanced dedicated channel uplink data frame sent by the node B which only has the enhanced dedicated channel cell of a single carrier frequency layer in the multi-carrier; and if all the nodes B governed by the drift radio network controller are nodes B of the enhanced dedicated channel cell of a single carrier frequency layer in the multi-carrier and are in an identical carrier frequency layer, the drift radio network controller not processing the received enhanced dedicated channel uplink data frame and sending the received enhanced dedicated channel uplink data frame to the serving radio network controller;

if all the nodes B governed by the drift radio network controller are nodes B of the enhanced dedicated channel cell of a single carrier frequency layer in the multi-carrier but do not belong to an identical carrier frequency layer, or all the nodes B governed by the drift radio network controller are not all nodes B of the enhanced dedicated channel cell of a single carrier frequency layer in the multi-carrier, the drift radio network controller setting the "uplink multiplexing information" which is "null" in the received enhanced dedicated channel uplink data frame as carrier identifier information of the carrier for receiving data carried in the enhanced dedicated channel uplink data frame and sending that enhanced dedicated channel uplink data frame to the serving radio network controller;

the second receiving step comprising: the serving radio network controller receiving the enhanced dedicated channel uplink data frame sent by the drift radio network controller of a relay party which only has the enhanced dedicated channel cell of a single carrier frequency layer in the multi-carrier, the serving radio network controller distinguishing which carrier in the multi-carrier is a carrier for receiving data carried in the enhanced dedicated channel uplink data frame based on carrier identifier information corresponding to the carrier frequency of the enhanced dedicated channel cell recorded when the enhanced dedicated channel cell of the single carrier frequency layer in the multi-carrier is established or added in advance;

wherein the second sending step further comprises: when the node B has an enhanced dedicated channel cell of frequency layers of any two or more carriers in the multi-carrier, the node B setting "uplink multiplexing information" in the enhanced dedicated uplink data frame as carrier identifier information of a carrier for receiving data carried in the enhanced dedicated channel uplink data frame; the node B sending the enhanced dedicated channel uplink data frame to the drift radio network controller;

the relaying step further comprises: the drift radio network controller receiving the enhanced dedicated channel uplink data frame sent by the node B which has the enhanced dedicated channel uplink data frame of frequency layers of any two or more carriers in the multi-carrier, the drift radio network controller not processing the received enhanced dedicated channel uplink data frame and sending the received enhanced dedicated channel uplink data frame to the serving radio network controller;

the second receiving step further comprises: the serving radio network controller receiving the enhanced dedicated channel uplink data frame sent by the drift radio network controller of the relay party of the sender which has the enhanced dedicated channel cell of frequency layers of any two or more carriers in the multi-carrier, the serving radio network controller distinguishing which carrier in the multi-carrier is a carrier for receiving data carried in the enhanced dedicated channel uplink data frame based on the carrier identifier information indicated by "uplink multiplexing information" in the enhanced dedicated channel uplink data frame.

2. The method according to claim 1, wherein the first sending step further comprises: when the node B has an enhanced dedicated channel cell of frequency layers of any two or more carriers in the multi-carrier, the node B setting "uplink multiplexing information" in the enhanced dedicated channel uplink data frame as carrier identifier information of a carrier for receiving data carried in the enhanced dedicated channel uplink data frame and sending the enhanced dedicated channel uplink data frame to the serving radio network controller;

the first receiving step further comprises: the serving radio network controller receiving the enhanced dedicated channel uplink data frame sent by the node B of the sender which has the enhanced dedicated channel cell of frequency layers of any two or more carriers in the multi-carrier, the serving radio network controller distinguishing which carrier in the multi-carrier is a carrier for receiving data carried in the enhanced dedicated channel uplink data frame based on the carrier identifier information indicated by "uplink multiplexing information" in the enhanced dedicated channel uplink data frame.

3. The method according to claim 1, wherein before the first sending step and the second sending step, the method further comprises:

the node B obtaining the carrier identifier information according to a following manner: the serving radio network controller or the drift radio network controller establishes or adds in the node B an enhanced dedicated channel cell of frequency layers of any two or more carriers in the multi-carrier and notifies the node B of the carrier identifier information corresponding to the carrier frequency of the enhanced dedicated channel cell.

4. The method according to claim 1, wherein before the relaying step, the method further comprises:
the drift radio network controller obtaining the carrier identifier information according to a following manner: the serving radio network controller establishes or adds in the drift radio network controller an enhanced dedicated channel cell of frequency layers of any two or more carriers in the multi-carrier and notifies the drift radio network controller of the carrier identifier information corresponding to the carrier frequency of the enhanced dedicated channel cell.

5. A method for sending multi-carrier enhanced dedicated channel data, comprising:
a drift radio network controller receiving an enhanced dedicated channel uplink data frame sent by a node B which only has an enhanced dedicated channel cell of a single carrier frequency layer in multi-carrier; and
if all the nodes B governed by the drift radio network controller are all nodes B of the enhanced dedicated channel cell of a single carrier frequency layer in the multi-carrier and are in an identical carrier frequency layer, the drift radio network controller not processing the received enhanced dedicated channel uplink data frame and sending the received enhanced dedicated channel uplink data frame to the serving radio network controller;
if all the nodes B governed by the drift radio network controller are nodes B of the enhanced dedicated channel cell of a single carrier frequency layer in the multi-carrier but do not belong to an identical carrier frequency layer, or if all the nodes B governed by the drift radio network controller are not all nodes B of the enhanced dedicated channel cell of a single carrier frequency layer in the multi-carrier, the drift radio network controller setting "uplink multiplexing information" which is "null" in the received enhanced dedicated channel uplink data frame as carrier identifier information of the carrier for receiving data carried in the enhanced dedicated channel uplink data frame and sending that enhanced dedicated channel uplink data frame to the serving radio network controller.

6. The method according to claim 5 further comprising: the drift radio network controller receiving an enhanced dedicated channel uplink data frame sent by a node B which has an enhanced dedicated channel cell of frequency layers of any two or more carriers in the multi-carrier, the drift radio network controller not processing the received enhanced dedicated channel uplink data frame and sending the received enhanced dedicated channel uplink data frame to the serving radio network controller.

7. The method according to claim 5, wherein before the step of the drift radio network controller receiving the enhanced dedicated channel uplink data frame, the method further comprises:
the drift radio network controller establishing or adding in the node B an enhanced dedicated channel cell of frequency layers of any two or more carriers in the multi-carrier and notifying the node B of the carrier identifier information corresponding to the carrier frequency of the enhanced dedicated channel cell.

8. A method for receiving multi-carrier enhanced dedicated channel data, comprising:
a serving radio network controller receiving an enhanced dedicated channel uplink data frame sent by a drift radio network controller of a relay party or a node B of a sender which only has an enhanced dedicated channel cell of a single carrier frequency layer in multi-carrier, the serving radio network controller distinguishing which carrier in the multi-carrier is a carrier for receiving data carried in the enhanced dedicated uplink data frame based on carrier identifier information corresponding to a carrier frequency of an enhanced dedicated channel cell recorded when the enhanced dedicated channel cell of a single carrier frequency layer in the multi-carrier is established or added in advance;
before the step of the serving radio network controller receiving the enhanced dedicated channel uplink data frame, the method further comprises: the serving radio network controller establishing or adding in the node B or the drift radio network controller an enhanced dedicated channel cell of frequency layers of any two or more carriers in the multi-carrier and notifying the node B or the drift radio network controller of the carrier identifier information corresponding to the carrier frequency of the enhanced dedicated channel cell.

9. The method according to claim 8 further comprising: the serving radio network controller receiving an enhanced dedicated channel uplink data frame sent by a node B of a sender or a drift radio network controller of a relay party which has an enhanced dedicated channel cell of frequency layers of any two or more carriers in the multi-carrier, the serving radio network controller distinguishing which carrier in the multi-carrier is a carrier for receiving data carried in the enhanced dedicated channel uplink data frame based on carrier identifier information indicated by "uplink multiplexing information" in the enhanced dedicated channel uplink data frame.

10. A system for transmitting multi-carrier enhanced dedicated channel data, comprising: a first node B and a first serving radio network controller, wherein:
the first node B is configured to set "uplink multiplexing information" in an enhanced dedicated channel uplink date frame to be "null" and send the enhanced dedicated channel uplink data frame to the first serving radio network controller when the first node B only has the enhanced dedicated channel cell of a single carrier frequency layer in multi-carrier;
the first serving radio network controller is configured: to receive an enhanced dedicated channel uplink data frame sent by a first node B of a sender which only has an enhanced dedicated channel cell of a single carrier frequency layer in the multi-carrier, and to distinguish which carrier in the multi-carrier is a carrier for receiving data carried in the enhanced dedicated channel uplink data frame based on carrier identifier information corresponding to a carrier frequency of an enhanced dedicated channel cell recorded when the enhanced dedicated channel cell of a single carrier frequency layer in the multi-carrier is established or added in advance;
or, the system comprises: a second node B, a drift radio network controller and a second serving radio network controller, wherein:
the second node B is configured: to set "uplink multiplexing information" in the enhanced dedicated channel data frame to be "null" when the second node B only has the enhanced dedicated channel cell of a single carrier frequency layer in the multi-carrier; and to send the enhanced dedicated channel uplink data frame to the drift radio network controller;
the drift radio network controller is configured to receive the enhanced dedicated channel uplink data frame sent by the second node B which only has an enhanced dedicated channel cell of a single carrier frequency layer in the multi-carrier; and if all the nodes B governed by the drift radio network controller are nodes B of the enhanced dedicated channel cell of a single carrier frequency layer in the multi-carrier and are in an identical carrier frequency layer, the drift radio network controller not processing the received enhanced dedicated channel uplink data frame and sending the received enhanced dedicated channel uplink data frame to the second serving radio network controller;

if all the nodes B governed by the drift radio network controller are nodes B of the enhanced dedicated channel cell of a single carrier frequency layer in the multi-carrier but do not belong to an identical carrier frequency layer, or if all the nodes B governed by the drift radio network controller are not all nodes B of the enhanced dedicated channel cell of a single carrier frequency layer in the multi-carrier, the drift radio network controller setting "uplink multiplexing information" which is "null" in the received enhanced dedicated channel uplink data frame as carrier identifier information of a carrier for receiving data carried in the enhanced dedicated channel uplink data frame and sending that enhanced dedicated channel uplink data frame to the second radio network controller;

the second serving radio network controller is configured: to receive the enhanced dedicated channel uplink data frame sent by the drift radio network controller of a relay party which only has an enhanced dedicated channel cell of a single carrier frequency layer in the multi-carrier, and to distinguish which carrier in the multi-carrier is a carrier for receiving data carried in the enhanced dedicated channel uplink data frame based on the carrier identifier information corresponding to the carrier frequency of the enhanced dedicated channel cell recorded when the enhanced dedicated channel cell of a single carrier frequency layer in the multi-carrier is established or added in advance;

wherein, the second node B is further configured: to set "uplink multiplexing information" in the enhanced dedicated channel uplink data frame as carrier identifier information of a carrier for receiving data carried in the enhanced dedicated channel uplink data frame, and to send the enhanced dedicated channel uplink data frame to the drift radio network controller, when the second node B has the enhanced dedicated channel cell of frequency layers of any two or more carriers in the multi-carrier;

the drift radio network controller is further configured: to receive an enhanced dedicated channel uplink data frame sent by the node B which has the enhanced dedicated channel cell of frequency layers of any two or more carriers in the multi-carrier, to not process the received enhanced dedicated channel uplink data frame, and to send the received enhanced dedicated channel uplink data frame to the second serving radio network controller;

the serving radio network controller is further configured: to receive an enhanced dedicated channel uplink data frame sent by the drift radio network controller of the relay party of the sender which has the enhanced dedicated channel cell of frequency layers of any two or more carriers in the multi-carrier, and to distinguish which carrier in the multi-carrier is a carrier for receiving data carried in the enhanced dedicated channel uplink data frame based on the carrier identifier information indicated by "uplink multiplexing information" in the enhanced dedicated channel uplink data frame.

11. The system according to claim 10, wherein:
the first node B is further configured: to set "uplink multiplexing information" in the enhanced dedicated channel uplink data frame as carrier identifier information of a carrier for receiving data carried in the enhanced dedicated channel uplink data frame, and to send the enhanced dedicated channel uplink data frame to the first serving radio network controller, when the first node B has the enhanced dedicated channel cell of frequency layers of any two or more carriers in the multi-carrier;

the first serving radio network controller is further configured: to receive an enhanced dedicated channel uplink data frame sent by the first node B of the sender which has the enhanced dedicated channel cell of frequency layers of any two or more carriers in the multi-carrier, and to distinguish which carrier in the multi-carrier is a carrier for receiving data carried in the enhanced dedicated channel uplink data frame based on the carrier identifier information indicated by "uplink multiplexing information" in the enhanced dedicated channel uplink data frame.

12. The system according to claim 10, wherein:
the drift radio network controller is further configured: to establish or add in the second node B an enhanced dedicated channel cell of frequency layers of any two or more carriers in the multi-carrier, and to notify the second node B of the carrier identifier information corresponding to the carrier frequency of the enhanced dedicated channel cell.

13. The system according to claim 10, wherein:
the first serving radio network controller and the second serving radio network controller are further configured: to establish or add in the drift radio network controller or the first node B an enhanced dedicated channel cell of frequency layers of any two or more carriers in the multi-carrier and to notify the drift radio network controller or the first node B of the carrier identifier information corresponding to the carrier frequency of the enhanced dedicated channel cell.

14. An apparatus comprising:
a drift radio network controller, which is configured to receive an enhanced dedicated channel uplink data frame sent by a node B which only has an enhanced dedicated channel cell of a single carrier frequency layer in multi-carrier; and to not process the received enhanced dedicated channel uplink data frame and send the received enhanced dedicated channel uplink data frame to a serving radio network controller if all the nodes B governed by the drift radio network controller are all nodes B of the enhanced dedicated channel cell of a single carrier frequency layer in the multi-carrier and are in an identical carrier frequency layer;

to set "uplink multiplexing information" which is "null" in the received enhanced dedicated channel uplink data frame as carrier identifier information of a carrier for receiving data carried in the enhanced dedicated channel uplink data frame and send that enhanced dedicated channel uplink data frame to the serving radio network controller, if all the nodes B governed by the drift radio network controller are all nodes B of the enhanced dedicated channel cell of a single carrier frequency layer in the multi-carrier but do not belong to an identical carrier frequency layer or if all the nodes B governed by the drift radio network controller are not all nodes B of the enhanced dedicated channel cell of a single carrier frequency layer in the multi-carrier.

15. The apparatus of claim 14, wherein the drift radio network controller is further configured to receive an enhanced dedicated channel uplink data frame sent by a node B which has an enhanced dedicated channel cell of frequency layers of any two or more carriers in the multi-carrier, and to not process the received enhanced dedicated uplink data frame and send the received enhanced dedicated uplink data frame to the serving radio network controller.

16. The apparatus of claim 14, wherein the drift radio network controller is further configured to establish or add in the node B an enhanced dedicated channel cell of frequency layers of any two or more carriers in the multi-carrier, and to notify the node B of carrier identifier information corresponding to a carrier frequency of the enhanced dedicated channel cell.

17. An apparatus comprising:

a serving radio network controller, which is configured to receive an enhanced dedicated channel uplink data frame sent by a drift radio network controller of a relay party or a node B of a sender which only has an enhanced dedicated channel cell of a single carrier frequency layer in multi-carrier, and to distinguish which carrier in the multi-carrier is a carrier for receiving data carried in the enhanced dedicated channel uplink data frame based on carrier identifier information corresponding to a carrier frequency of an enhanced dedicated channel cell recorded when the enhanced dedicated channel cell of a single carrier frequency layer in the multi-carrier is established or added in advance;

wherein the serving radio network controller is further configured: to receive an enhanced dedicated channel uplink data frame sent by the drift radio network controller of the relay party or a node B of the sender which has an enhanced dedicated channel cell of frequency layers of any two or more carriers in the multi-carrier, and to distinguish which carrier in the multi-carrier is a carrier for receiving data carried in the enhanced dedicated channel data frame based on carrier identifier information indicated by "uplink multiplexing information" in the enhanced dedicated channel uplink data frame.

18. The apparatus of claim 17, wherein the serving radio network controller is further configured to establish or add in the node B or the drift radio network controller an enhanced dedicated channel cell of frequency layers of any two or more carriers in the multi-carrier and to notify the node B or the drift radio network controller of the carrier identifier information corresponding to the carrier frequency of the enhanced dedicated channel cell.

* * * * *